United States Patent
Choi et al.

(10) Patent No.: US 12,298,506 B2
(45) Date of Patent: May 13, 2025

(54) OPTICAL SYSTEMS WITH LOW RESOLUTION PERIPHERAL DISPLAYS

(71) Applicant: Apple Inc., Cupertino, CA (US)

(72) Inventors: Hyungryul Choi, San Jose, CA (US); Bradley C. Steele, La Jolla, CA (US); Brian S. Lau, Sacramento, CA (US); Cameron A. Harder, San Francisco, CA (US); David A. Kalinowski, Davis, CA (US); Eric J. Hansotte, Morgan Hill, CA (US); Guolin Peng, Sunnyvale, CA (US); Scott M. DeLapp, San Diego, CA (US); Vikrant Bhakta, Santa Clara, CA (US); Jonathan C. Moisant-Thompson, San Jose, CA (US)

( * ) Notice: Subject to any disclaimer, the term of this patent is extended or adjusted under 35 U.S.C. 154(b) by 655 days.

(21) Appl. No.: 17/474,349

(22) Filed: Sep. 14, 2021

(65) Prior Publication Data
US 2021/0405378 A1 Dec. 30, 2021

Related U.S. Application Data

(63) Continuation of application No. PCT/US2020/050189, filed on Sep. 10, 2020.
(Continued)

(51) Int. Cl.
*G02B 27/01* (2006.01)
*F21V 8/00* (2006.01)
(Continued)

(52) U.S. Cl.
CPC .......... *G02B 27/0172* (2013.01); *G02B 5/32* (2013.01); *G02B 6/005* (2013.01); *G02F 1/137* (2013.01);
(Continued)

(58) Field of Classification Search
CPC .......................................... G02B 27/01–0189
See application file for complete search history.

(56) References Cited

U.S. PATENT DOCUMENTS 5,726,670 A * 3/1998 Tabata ................. G02B 27/017 345/7
6,014,117 A * 1/2000 Hennessy ............ G02B 27/017 345/9
(Continued)

FOREIGN PATENT DOCUMENTS

KR 20220120664 A * 8/2022

*Primary Examiner* — Christopher Stanford
(74) *Attorney, Agent, or Firm* — Treyz Law Group, P.C.; Michael H. Lyons; Jinie M. Guihan

(57) ABSTRACT

An electronic device may include an optical combiner with a waveguide. The waveguide may have an output coupler that directs high resolution light towards an eye box within a field of view. Peripheral light sources may provide low resolution peripheral light to the eye box about a periphery of the field of view. The peripheral light sources may be mounted to a frame for the waveguide, to an additional substrate mounted to the frame and overlapping the waveguide, in a low resolution projector that projects the peripheral light towards reflective structures in the additional substrate, or in a display module that produces the high resolution light. The optical combiner may overlay real world light with the high resolution light and the low resolution peripheral light.

21 Claims, 23 Drawing Sheets

Related U.S. Application Data

(60) Provisional application No. 62/902,721, filed on Sep. 19, 2019.

(51) Int. Cl.
  *G02B 5/32* (2006.01)
  *G02F 1/137* (2006.01)
  *G03H 1/02* (2006.01)

(52) U.S. Cl.
  CPC ... *G03H 1/0248* (2013.01); *G02B 2027/0174* (2013.01)

(56) References Cited

U.S. PATENT DOCUMENTS

| | | | |
|---|---|---|---|
| 6,529,331 B2* | 3/2003 | Massof | G06F 3/013 |
| | | | 345/9 |
| 7,495,638 B2* | 2/2009 | Lamvik | G09G 3/3233 |
| | | | 345/76 |
| 9,383,582 B2 | 7/2016 | Tang et al. | |
| 9,606,362 B2* | 3/2017 | Passmore | H04N 13/324 |
| 9,720,163 B2* | 8/2017 | Wang | G02B 27/28 |
| 9,990,008 B2* | 6/2018 | Passmore | G06F 1/1684 |
| 10,175,487 B2* | 1/2019 | Benko | G06T 19/006 |
| 10,310,274 B1* | 6/2019 | Reichow | G02B 27/026 |
| 10,353,202 B2* | 7/2019 | Tervo | G02B 6/0026 |
| 10,488,665 B2* | 11/2019 | Sahlsten | G02B 27/017 |
| 10,701,351 B2* | 6/2020 | Komatsu | H04N 13/344 |
| 11,002,968 B2* | 5/2021 | Ouderkirk | G09G 3/32 |
| 11,030,973 B2* | 6/2021 | Moore | G06F 3/013 |
| 11,073,701 B2* | 7/2021 | Matsumura | G02B 27/022 |
| 11,163,163 B2* | 11/2021 | Connor | G02B 27/0172 |
| 11,209,650 B1* | 12/2021 | Trail | G02B 6/0023 |
| 11,852,819 B2* | 12/2023 | Myhre | G02B 27/0093 |
| 11,867,907 B2* | 1/2024 | Bhakta | G02B 27/0172 |
| 2008/0106489 A1* | 5/2008 | Brown | G02B 27/0176 |
| | | | 345/9 |
| 2013/0214998 A1* | 8/2013 | Andes | G02B 27/0172 |
| | | | 345/8 |
| 2014/0146394 A1* | 5/2014 | Tout | G02B 26/10 |
| | | | 359/630 |
| 2014/0266990 A1* | 9/2014 | Makino | G02B 27/0172 |
| | | | 345/8 |
| 2016/0085300 A1 | 3/2016 | Robbins et al. | |
| 2016/0377869 A1* | 12/2016 | Lee | G02B 27/0172 |
| | | | 359/631 |
| 2017/0115489 A1* | 4/2017 | Hu | G02B 27/0172 |
| 2017/0285349 A1 | 10/2017 | Ayres et al. | |
| 2018/0284451 A1* | 10/2018 | Eash | G06F 3/011 |
| 2019/0094981 A1 | 3/2019 | Bradski et al. | |
| 2019/0285897 A1* | 9/2019 | Topliss | G02B 27/0172 |
| 2023/0221558 A1* | 7/2023 | Parker | H04N 23/23 |
| | | | 345/8 |
| 2023/0341689 A1* | 10/2023 | Bhakta | G02B 27/0093 |

* cited by examiner

OPTICAL SYSTEMS WITH LOW RESOLUTION PERIPHERAL DISPLAYS

This application is a continuation of International Patent Application No. PCT/US2020/050189, filed Sep. 10, 2020, which claims the benefit of U.S. Provisional Patent Application No. 62/902,721, filed Sep. 19, 2019, which are hereby incorporated by reference herein in their entireties.

BACKGROUND

This relates generally to electronic devices and, more particularly, to electronic devices with optical components.

Electronic devices sometimes include optical components. For example, a wearable electronic device such as a head-mounted device may include a display for displaying an image close to a user's eyes.

To allow a head-mounted device to display a computer-generated image that is overlaid on top of real-world images, the head-mounted device may have a transparent display system. The system may have an optical combiner that merges real-world image light with computer-generated content.

It can be challenging to design devices such as these. If care is not taken, the components used in displaying content may be unsightly and bulky and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The near-eye display may include a main display and a peripheral display. The main display may include a display module that produces main display light. The main display light may be coupled into a waveguide by an input coupler. The waveguide may form an optical combiner that transmits real world light to an eye box and that overlays the main display light with the real world light. The waveguide may have an output coupler that redirects the main display light towards the eye box within a field of view. The output coupler may include diffractive grating structures such as volume holograms. The waveguide may have peripheral edges mounted to a frame.

The peripheral display may include peripheral light sources that produce peripheral display light. The peripheral light may be directed towards the eye box about a periphery of the field of view. The peripheral light may be lower resolution than the main display light. The peripheral light sources may be mounted to the frame and configured to scatter light off of a surface of the waveguide towards the eye box.

If desired, a substrate may be mounted to the frame overlapping the waveguide. The substrate may be continuous or ring-shaped with an opening overlapping the output coupler. The peripheral light sources may convey the peripheral light to the eye box through the substrate. Optical channels or diffusers may be formed on or in the substrate to help direct the peripheral light towards the eye box. If desired, the peripheral light sources may be embedded within the substrate or formed at a surface of the substrate. The peripheral light sources may surround a periphery of the output coupler. If desired, the peripheral light sources may fill an area of the substrate between the periphery of the output coupler and the frame. Microlenses or other microstructures may be used to help direct the peripheral light towards the eye box. In scenarios where the peripheral light sources are embedded within the substrate, the peripheral light sources may reflect the peripheral light off of curved cavities in the substrate and overlapping the peripheral light sources.

If desired, the peripheral light sources may be located in a low resolution projector that projects the peripheral light. The substrate may include reflective structures that reflect the peripheral light towards the eye box. The reflective structures may include a switchable liquid crystal layer, micro-structures such as angled portions of a surface of the substrate, angled partially-reflective mirrors embedded in the substrate, or diffractive grating structures layered on the substrate.

If desired, the peripheral light sources may be located in a display module for the main display. The main display may be a reflective display having illumination optics and a reflective display panel. The peripheral light sources may be disposed along a periphery of the reflective display panel or within the illumination optics. In scenarios where the peripheral light sources are located within the illumination optics, fixed mirrors may be disposed along a periphery of the reflective display panel for reflecting the peripheral light. A switchable liquid crystal layer may be disposed overlapping the fixed mirrors if desired. In scenarios where the display module includes an emissive display panel that emits the main display light, the peripheral light sources may be disposed along a periphery of the emissive display panel. The output coupler may include extended portions that redirect the peripheral light from the display module towards the eye box about a periphery of the field of view.

DETAILED DESCRIPTION

Figure 1:
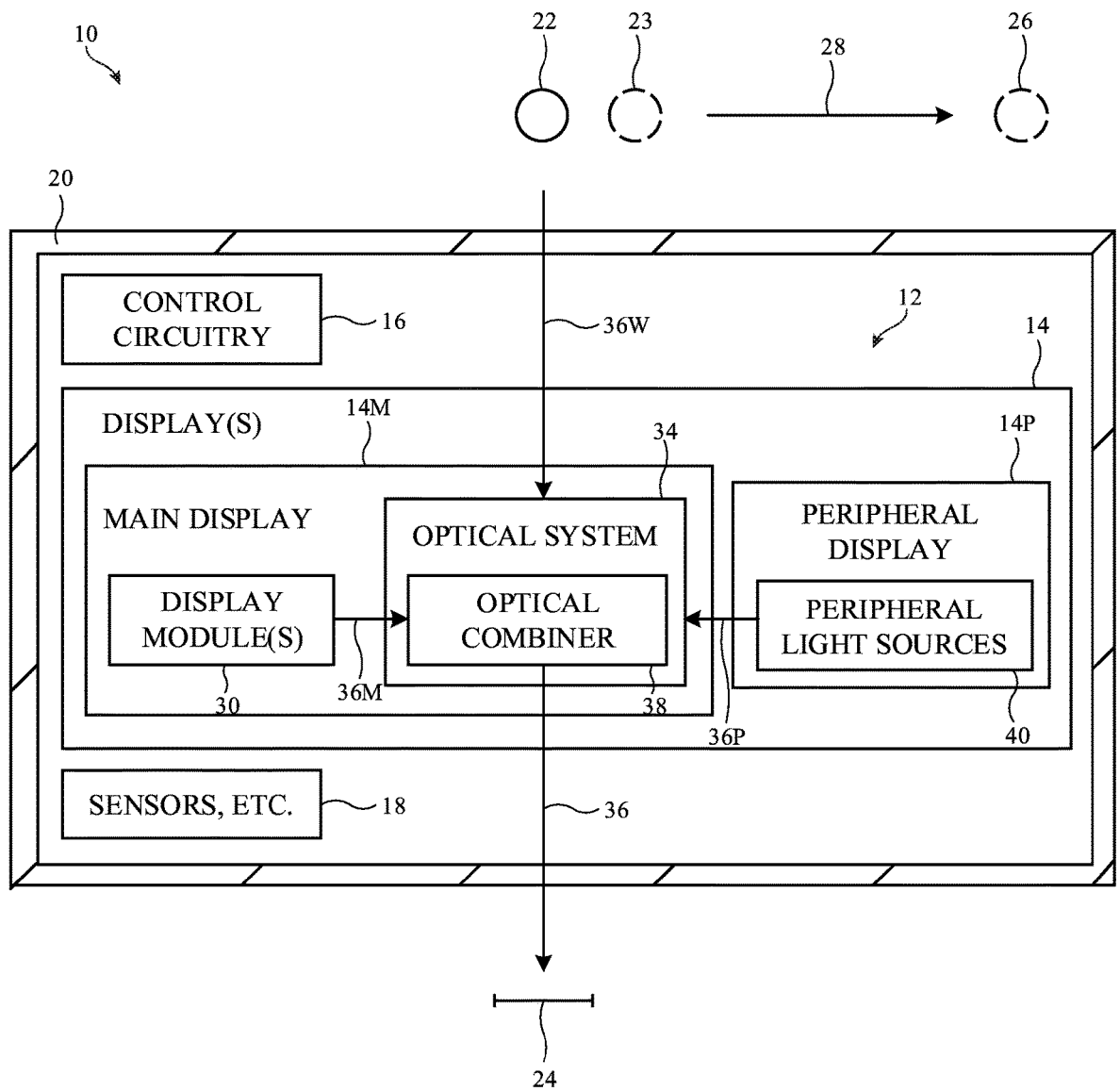
FIG. 1 is a diagram of an illustrative electronic device having a display in accordance with some embodiments.

An illustrative system having a device with one or more near-eye display systems is shown in FIG. 1. System 10 may be an electronic device such as a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user.

Displays 14 may contain optical components for displaying visual content to a user's eye at eye box 24. The head-mounted support structures may support displays 14. Displays 14 may be part of an optical system that combines real-world image light with light from an image source. In this way, computer-generated images (sometimes referred to as virtual images) may be overlaid on top of real-world images.

The operation of system 10 (sometimes referred to herein as device 10) may be controlled using control circuitry 16. Control circuitry 16 may include storage and processing circuitry for controlling the operation of device 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for device 10 (e.g., data gathering operations, operations involving the adjustment of components using control signals, image rendering operations to produce image content to be displayed for a user, etc.).

Device 10 may include input-output circuitry such as input-output devices 12. Input-output devices 12 may be used to allow data to be received by device 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which device 10 is operating. Output components in devices 12 may allow device 10 to provide a user with output and may be used to communicate with external electrical equipment.

Control circuitry 16 may include wired and wireless communications circuitry. For example, the control circuitry may include radio-frequency transceiver circuitry such as cellular telephone transceiver circuitry, wireless local area network (WiFi®) transceiver circuitry, millimeter wave transceiver circuitry, and/or other wireless communications circuitry. Device 10 may be used in a system of multiple electronic devices. During operation, the communications circuitry of device 10 may be used to support communication between device 10 and other electronic devices in the system. For example, one electronic device may transmit video and/or audio data to device 10 or another electronic device in the system. Electronic devices in the system may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

The input-output devices of device 10 may include one or more displays such as displays 14. In some configurations, displays 14 in device 10 may include left and right display devices (e.g., left and right components such as left and right scanning mirror display devices, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display devices panels, and/or or other left and right display devices in alignment with the user's left and right eyes, respectively). In other configurations, displays 14 include a single display panel that extends across both eyes or uses other arrangements in which content is provided with a single pixel array.

Displays 14 of device 10 are used to display visual content for a user of device 10. The content that is presented on the displays may include virtual objects and other content that is provided to displays 14 by control circuitry 16 and may sometimes be referred to as computer-generated content. An image on the displays such as an image with computer-generated content may be displayed in the absence of real-world content or may be combined with real-world content. In some configurations, a real-world image may be captured by a camera (e.g., a forward-facing camera) so that computer-generated content may be electronically overlaid on portions of the real-world image (e.g., when device 10 is a pair of virtual reality goggles with an opaque display). Configurations in which an optical combiner that is associated with displays 14 is used to merge real-world images with display images are sometimes described herein as an example.

Input-output devices 12 may include sensors and other components 18. Sensors in components 18 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, light sensors that make user measurements, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in the input-output devices 12 of device 10. If desired, device 10 may include haptic output devices (e.g., vibrating components), light-emitting diodes and other light sources, speakers such as ear speakers for producing audio output, and other electrical components used for input and output. If desired, device 10 may include circuits for receiving wireless power, circuits for transmitting power wirelessly to other devices, batteries and other energy storage devices (e.g., capacitors), joysticks, buttons, and/or other components.

As shown in FIG. 1, displays 14 may include a main portion such as main display 14M and peripheral portions such as peripheral display 14P. In practice, displays 14 may include two main displays 14M and two peripheral displays 14P (e.g., for providing light to left and right eye boxes 24). However, only a single main display 14M, a single peripheral display 14P, and a single eye box 24 is shown in FIG. 1 and described herein for the sake of clarity.

Main display 14M may be a high-resolution display for displaying computer-generated images to a user. For example, main display 14M may include display module(s) 30 and optical system 34. Display modules 30 may include reflective displays (e.g., liquid crystal on silicon (LCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. Light sources in display modules 30 may include uLEDs, OLEDs, LEDs, lasers, combinations of these, or any other desired light-emitting components.

Optical system 34 may include an optical combiner such as optical combiner 38. Display modules 30 may generate image light 36M (sometimes referred to herein as main display image light 36M or main display light 36M) that is provided to optical combiner 38 in optical system 34. Optical combiner 38 may allow a user with an eye in eye box 24 to view external real-world objects such as real-world object 22 (e.g., real world light 36W from object 22). Optical combiner 38 of main display 14M allows (virtual or computer generated) images in main display light 36M to be overlaid on top of real-world objects in world light 36 as shown by illustrative virtual object 23 (e.g., a virtual object in main display light 36M overlaid on top of an image in world light 36W that includes real object 22). The images in main display light 36M may be relatively high resolution images.

Peripheral display 14P may be located about the periphery of device 10 or about the periphery of optical combiner 38 out of the center of the user's field of view (e.g., the field of view of eye box 24 and an output coupler in optical combiner 38). Peripheral display 14P may have a relatively low resolution and may have a pixel density (pixels per inch value) that is at least ten times less than that of main display 14M, at least 100 times less than that of main display 14M, at least 250 times less than that of main display 14M, or any other pixel density less than that of main display 14M. Peripheral display 14P may therefore sometimes be referred to herein as low resolution display 14P or low resolution peripheral display 14P, whereas main display 14M is sometimes referred to herein as high resolution display 14M or high resolution main display 14M.

Peripheral display 14P may include peripheral display light sources 40 (e.g., light sources having a pixel density less than that of main display 14M). Peripheral display light sources 40 (sometimes referred to herein as peripheral light sources 40) may produce image light 36P (sometimes referred to herein as low resolution image light 36P, peripheral image light 36P, peripheral display light 36P, peripheral display image light 36P, or peripheral light 36P). Peripheral light sources 40 may provide peripheral light 36P to eye box 24 via optical system 34 (e.g., optical components in optical system 34 may help direct peripheral light 36P to eye box 24) or may provide peripheral light 36P to eye box 24 directly (e.g., without passing through optical system 34). Peripheral light 36P may include image data (e.g., low resolution image data) produced by control circuitry 16. Peripheral light 36P may be overlaid with some or none of main image light 36M and/or world light 36W at eye box 24. Eye box 24 may receive image light 36 from optical system 34. Image light 36 (sometimes referred to herein as light 36) may include main image light 36M, world light 36W, and/or peripheral light 36P.

In one suitable arrangement that is sometimes described herein as an example, optical system 34 may present in-focus image data (e.g., an in-focus version of virtual object 22) to eye box 24. Peripheral light sources 40 may create diffuse light in the user's peripheral vision (e.g., at eye box 24). The diffuse light may create a diffuse illuminated object such as diffuse object 26 of FIG. 1, but the illumination associated with diffuse object 26 will generally be too unfocused to be used in displaying a sharp image for the user (as an example). Nevertheless, because human visual acuity is low in peripheral regions, the diffuse nature of the light emitted by peripheral display 14P may not be noticeable and/or may not be objectionable to the user. This allows the diffuse illumination provided by peripheral display 14P to supplement the images produced by main display 14M.

With this type of arrangement, main display 14M is used to present text, graphics, and other visual objects that are in focus, whereas peripheral display 14P helps provide continuity as on-screen objects such as object 22 move to the user's peripheral vision and vice versa. Consider, as an example, a scenario in which object 22 is a character in a game. The character may move to the right in direction 28. As the character moves to the user's peripheral vision, a diffuse area of light that corresponds to the character can be displayed by peripheral display 14P. Due to the presence of peripheral display 14P, there will not be a sharp cut-off location where the character will suddenly disappear from view. Rather, when the character reaches the user's peripheral vision (e.g., the portion of the user's vision that is outside of a circle of at least 60° in diameter or at least 120° in diameter about the user's point of gaze), the character will be replaced by corresponding diffuse illumination (e.g., a fuzzy unfocused version of the character). This provides the user with the visual illusion that the character has moved into the user's peripheral vision (sometimes referred to as object persistence).

The same type of behavior may be used to create object persistence when objects move from the user's peripheral vision to the use's normal (non-peripheral) vision. For example, it may be desirable for device 10 to alert the user to a virtual menu in a coffee shop. The presence of the menu may be made clear to the user by creating a diffuse version of the menu in the user's peripheral vision. Once the user's attention has been gained in this way and the user's point-of-gaze has become directed directly at the menu, main display 14M can display a high resolution version of the menu (e.g., a computer-generated menu image).

If desired, peripheral display 14P may be used to display light that serves as an alert (e.g., an alert that an incoming message has been received by device 10, an alert that a timer has expired, an alert that a hazardous object outside of the user's field of view is present, etc.). Patterns of light of one or more colors, one or more light intensities, fixed light and/or pulsed light of one or more different pulse durations, etc. may serve as alerts (sometimes referred to herein as visual indications) or may be used to provide a user with other information without necessarily involving the use of peripheral display 14P to present visual information corresponding to a particular spatial orientation. By using peripheral display 14P to display light that does not interfere with the operation of main display 14M, a user may be provided with an alert or other information without disturbing the user's view of real-world objects through main display 14M.

Peripheral display 14P is shown separate from main display 14M in FIG. 1 for the sake of clarity. If desired, some or all of peripheral display 14P may be integrated into the optical system 34 used in main display 14M. For example, peripheral light sources 40 may be mounted to optical combiner 38 and/or other portions of optical system 34. Peripheral display 14P may include light redirecting components in optical system 34 that help to direct peripheral light 36P towards eye box 24. In another suitable arrangement, peripheral light sources 40 may be formed as a part of display module 30 of main display 14M, whereas peripheral display 14P includes other components in optical system 34 that help to direct peripheral light 36P to eye box 24.

Figure 2:
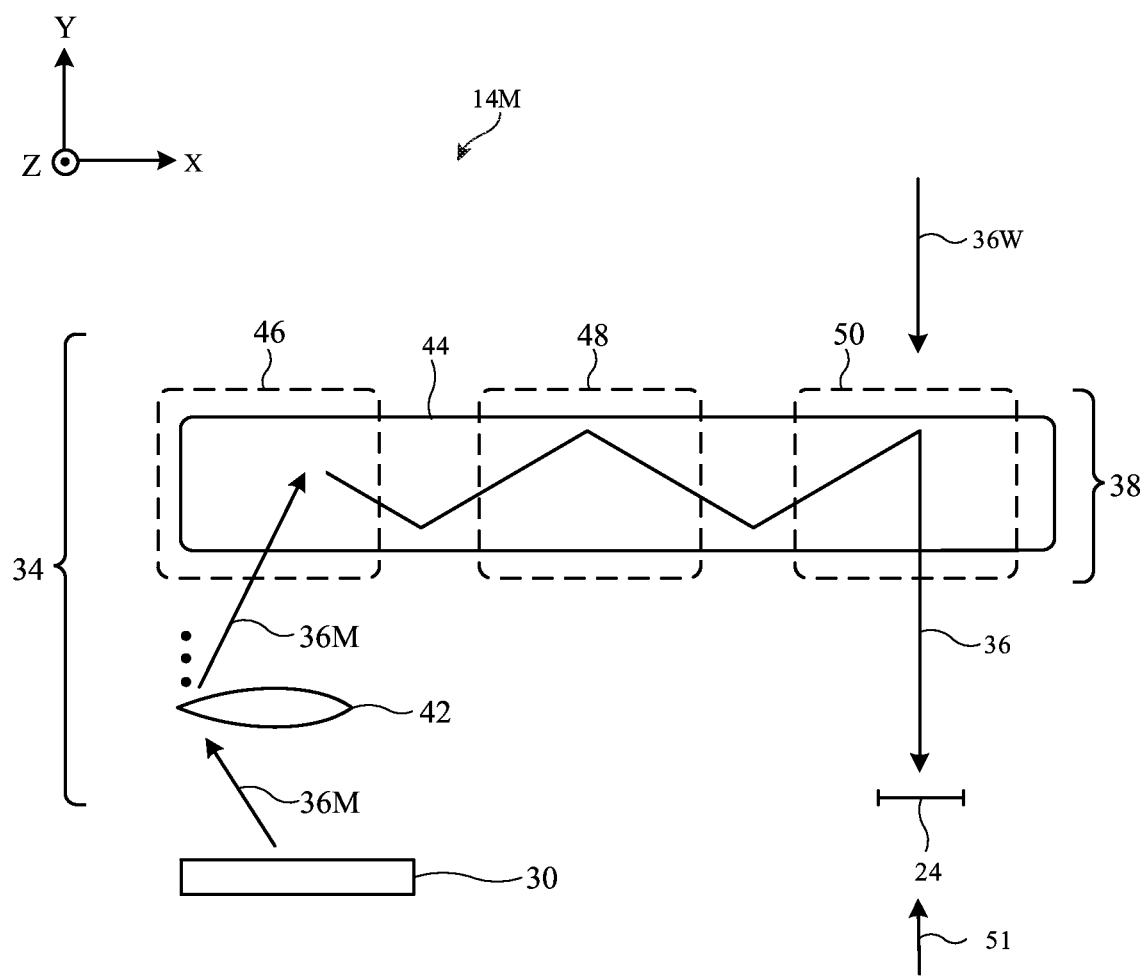
FIG. 2 is a top view of an illustrative optical system for a display having a waveguide with an output coupler in accordance with some embodiments.

FIG. 2 is a top view of an illustrative main display 14M that may be used in device 10 of FIG. 1. As shown in FIG. 2, main display 14M may include display module 30 and optical system 34. Optical system 34 may include optical elements such as one or more waveguides 44. Waveguide 44 may include one or more stacked substrates (e.g., stacked planar and/or curved layers sometimes referred to herein as waveguide substrates) of optically transparent material such as plastic, polymer, glass, etc.

If desired, waveguide 44 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 44 may include holographic phase gratings such as volume holograms or thin-film holograms, meta-gratings, or any other desired diffractive grating structures. The diffractive gratings on waveguide 44 may also include surface relief gratings formed on one or more surfaces of the substrates in waveguides 44, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Optical system 34 may include collimating optics such as collimating optics 42. Collimating optics 42 may include one or more lens elements that help direct main display light 36M from display module 30 towards waveguide 44. As shown in FIG. 2, display module 30 may generate main display light 36M associated with image content to be displayed to eye box 24. Main display light 36M may be collimated using a lens such as collimating optics 42. Optical system 34 may be used to present main display light 36M output from display module 30 to eye box 24 (e.g., as a part of light 36). Waveguide 44 may also form an optical combiner such as optical combiner 38. Waveguide 44 may transmit world light 36W to eye box 24 (e.g., as a part of light 36) so that objects in main display light 36M are overlaid with objects in world light 36W.

Optical system 34 may include one or more optical couplers such as input coupler 46, cross-coupler 48, and output coupler 50. In the example of FIG. 2, input coupler 46, cross-coupler 48, and output coupler 50 are formed at or on waveguide 44. Input coupler 46, cross-coupler 48, and/or output coupler 50 may be completely embedded within the substrate layers of waveguide 44, may be partially embedded within the substrate layers of waveguide 44, may be mounted to waveguide 44 (e.g., mounted to an exterior surface of waveguide 44), etc.

The example of FIG. 2 is merely illustrative. One or more of these couplers (e.g., cross-coupler 48) may be omitted. Optical system 34 may include multiple waveguides that are laterally and/or vertically stacked with respect to each other. Each waveguide may include one, two, all, or none of couplers 46, 50, and 48. Waveguide 44 may be at least partially curved or bent if desired.

Waveguide 44 may guide main display light 36M down its length via total internal reflection. Input coupler 46 may be configured to couple main display light 36M from display module 30 (optics 42) into waveguide 44, whereas output coupler 50 may be configured to couple main display light 36M from within waveguide 44 to the exterior of waveguide 44 and towards eye box 24. For example, display module 30 may emit main display light 36M in direction +Y towards optical system 34. When main display light 36M strikes input coupler 46, input coupler 46 may redirect main display light 36M so that the light propagates within waveguide 44 via total internal reflection towards output coupler 50 (e.g., in direction X). When main display light 36M strikes output coupler 50, output coupler 50 may redirect main display light 36M out of waveguide 44 towards eye box 24 (e.g., back along the Y-axis). In scenarios where cross-coupler 48 is formed at waveguide 44, cross-coupler 48 may redirect main display light 36M in one or more directions as it propagates down the length of waveguide 44, for example.

Input coupler 46, cross-coupler 48, and/or output coupler 50 may be based on reflective and refractive optics or may be based on holographic (e.g., diffractive) optics. In arrangements where couplers 46, 48, and 50 are formed from reflective and refractive optics, couplers 46, 48, and 50 may include one or more reflectors (e.g., an array of micromirrors, partial mirrors, or other reflectors). In arrangements where couplers 46, 48, and 50 are based on holographic optics, couplers 46, 48, and 50 may include diffractive gratings (e.g., volume holograms, surface relief gratings, etc.).

In one suitable arrangement that is sometimes described herein as an example, output coupler 50 is formed from diffractive gratings or micromirrors embedded within waveguide 44 (e.g., volume holograms recorded on a grating medium stacked between transparent polymer waveguide substrates, an array of micromirrors embedded in a polymer layer interposed between transparent polymer waveguide substrates, etc.), whereas input coupler 46 is formed from a reflective or transmissive prism mounted to an exterior surface of waveguide 44 (e.g., an exterior surface defined by a waveguide substrate that contacts the grating medium or the polymer layer used to form output coupler 50).

Waveguide 44 may transmit world light 36W through any desired portion of its lateral face. In one suitable arrangement that is sometimes described herein as an example, waveguide 44 may transmit world light 36W to eye box 24 within the lateral area of output coupler 50. Eye box 24 may receive light 36 within a corresponding field of view (e.g., eye box 24 may receive main display light 36M and world light 36W within its field of view and the field of view of output coupler 50). Peripheral light 36P of FIG. 1 may be provided to eye box 24 at or around the periphery of the field of view. Optical components such as lenses may be provided between waveguide 44 and eye box 24 if desired (e.g., for focusing light 36 onto eye box 24, providing light 36 with optical power, etc.).

Figure 3:
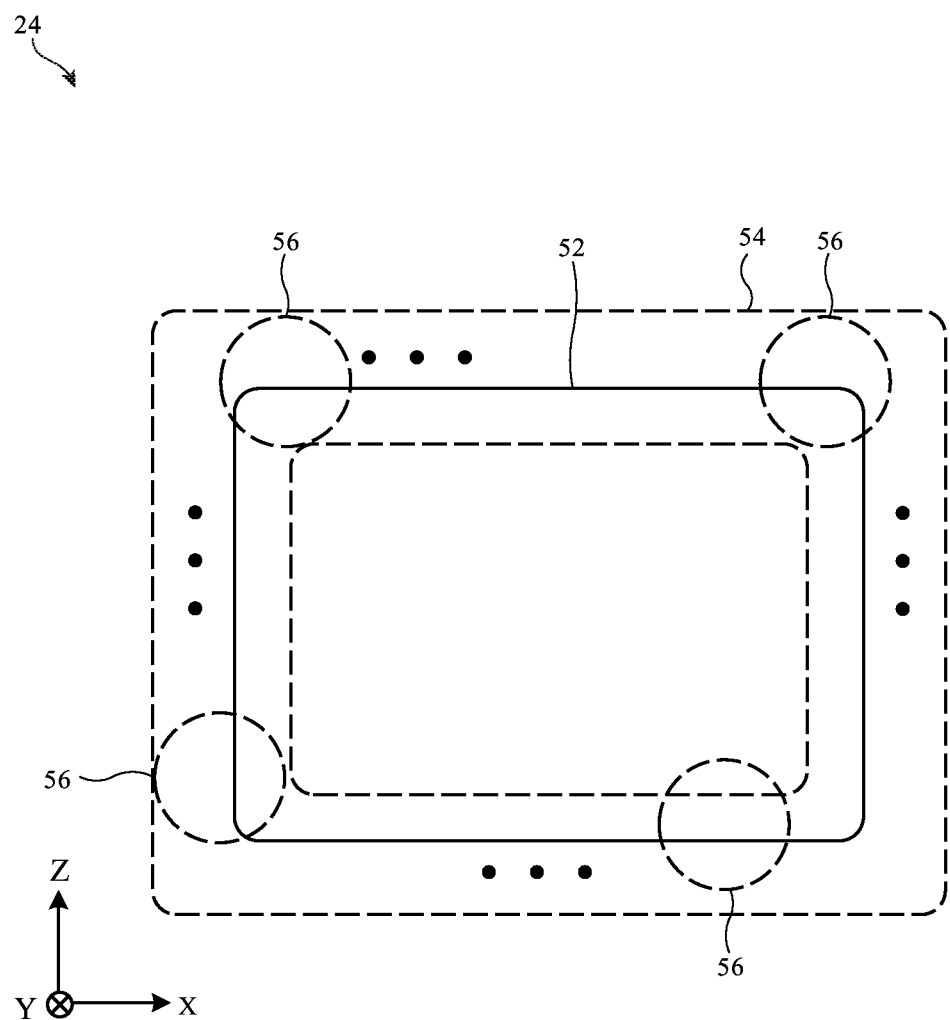
FIG. 3 front view of an illustrative image that may be presented to an eye box, including main display image light, peripheral display image light, and world light in accordance with some embodiments.

FIG. 3 is a front view of an illustrative image that may be presented to eye box 24 (e.g., as taken in the direction of arrow 51 of FIG. 2). As shown in FIG. 3, eye box 24 may receive main display light 36M (e.g., as coupled out of waveguide 44 by output coupler 50) within field of view 52. Eye box 24 may also receive world light 36M (e.g., as transmitted through output coupler 50) within field of view 52.

Eye box 24 may also receive peripheral light 36P (FIG. 1) within peripheral region 54. Region 54 may run (extend) around (e.g., surround) the periphery of field of view 52. Region 54 may partially or completely overlap field of view 52 or may be non-overlapping with respect to field of view 52. If desired, control circuitry 16 (FIG. 1) may control peripheral light sources 40 to provide peripheral light 36P within only a portion (subset) of region 54 at any given time. For example, peripheral light sources 40 may be selectively activated to provide peripheral light 36P within one or more sub-regions 56 of region 54 at any given time (e.g., to serve as a directional alert for a user at eye box 24, etc.). The example of FIG. 3 is merely illustrative. Field of view 52, region 54, and sub-regions 56 may have any desired shapes.

Figure 4:
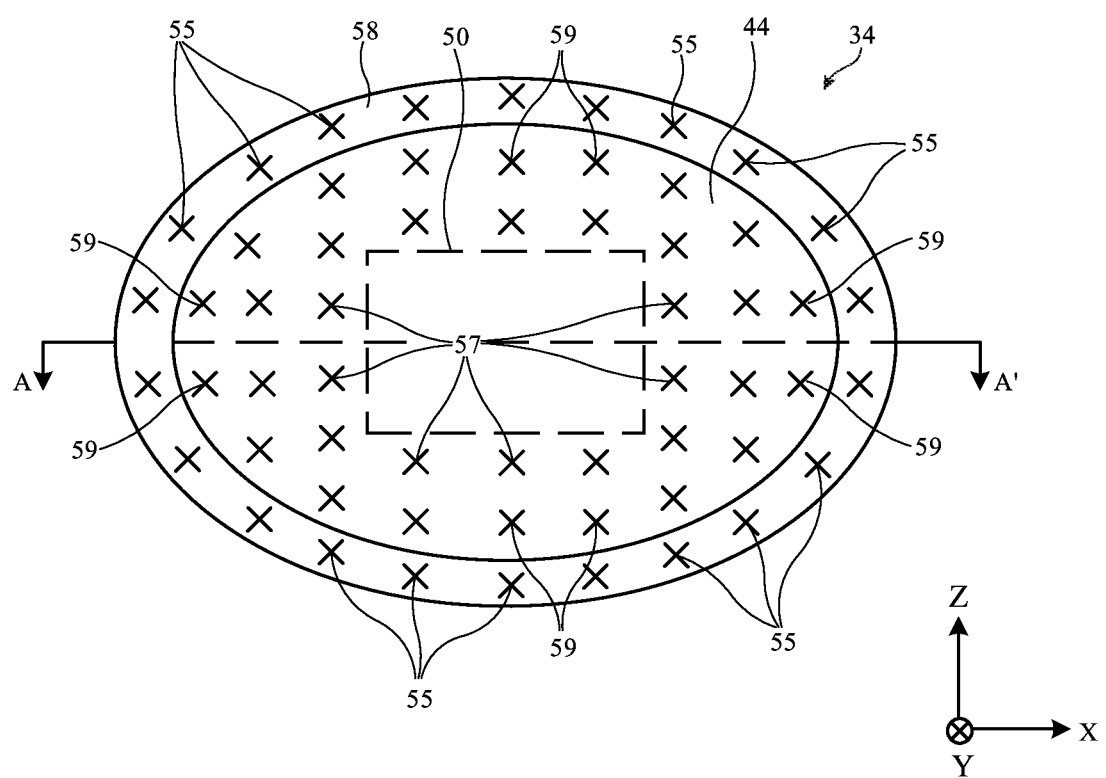
FIG. 4 is a front view of an illustrative optical system having a waveguide with an output coupler that presents main display image light to an eye box and having peripheral display light sources that present peripheral display light to the eye box in accordance with some embodiments.

FIG. 4 is a front view showing how peripheral light sources 40 of peripheral display 14P (FIG. 1) may be integrated into optical system 34 of main display 14M (e.g., as taken in the direction of arrow 51 of FIG. 2). As shown in FIG. 4, optical system 34 may include frame structures such as frame 58. Frame 58 may, for example, form part of support structures 20 of FIG. 1 and may be formed from plastic, glass, metal, conductive materials, dielectric materials, rubber, polymer, wood, and/or any other desired materials. Frame 58 (sometimes referred to herein as rim 58, support structures 58, or housing 58) may run around the lateral periphery of waveguide 44 (e.g., in the X-Z plane). Waveguide 44 (e.g., the peripheral edges of waveguide 44) may be mounted to frame 58 (e.g., frame 58 may hold waveguide 44 in place).

Output coupler 50 may be aligned with the center of the user's field of view at eye box 24 (FIG. 2). Output coupler 50 may couple main display light 36M (FIG. 2) out of waveguide 44 and towards the eye box (e.g., in the −Y direction) within its field of view (e.g., the field of view of the eye box). World light 36W (FIG. 2) may also pass through waveguide 44 to eye box 24 (e.g., in the −Y direction). World light 36W may pass through output coupler 50 and, if desired, portions of waveguide 44 that do not include output coupler 50.

Peripheral light sources 40 for peripheral display 14P may be mounted at any desired location at or around the periphery of the field of view of eye box 24 (e.g., at or around the lateral periphery of output coupler 50). For example, peripheral light sources 40 may be mounted within frame 58 (e.g., at locations 55), overlapping waveguide 44 at or adjacent to frame 58 (e.g., at locations 59), overlapping waveguide 44 at or adjacent to output coupler 50 (e.g., surrounding the periphery of output coupler 50 at locations 57), and/or at other locations in optical system 34. Peripheral light sources 40 may emit peripheral light 36P (FIG. 1) and may direct peripheral light 36P directly to eye box 24 or may direct peripheral light 36P to eye box 24 through other portions of optical system 34. The example of FIG. 4 is merely illustrative and, in general, frame 58 and waveguide 44 may have any desired lateral shapes.

Figure 5:
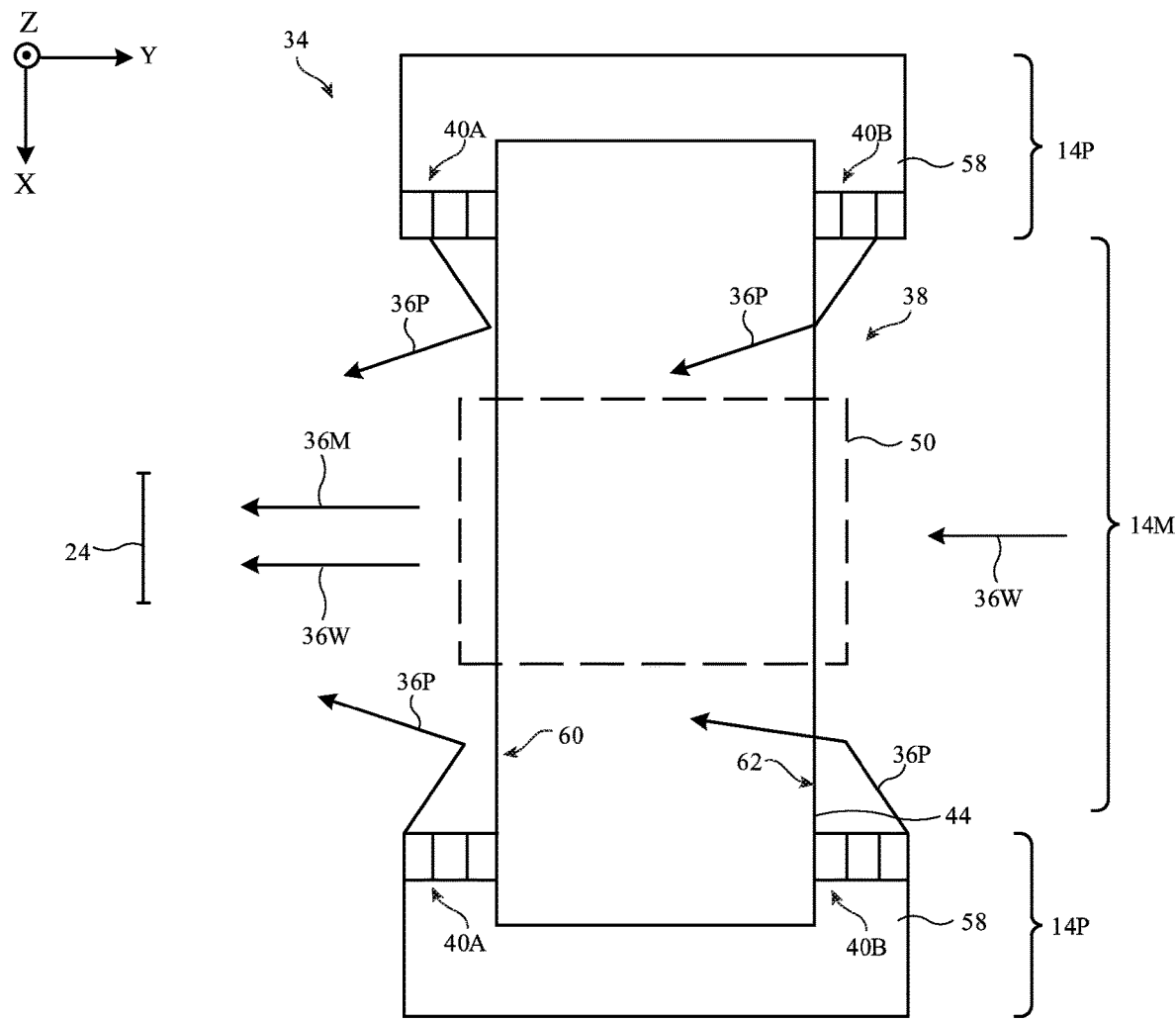
FIG. 5 is a cross-sectional top view of an illustrative optical system having peripheral display light sources mounted to a frame for a waveguide in accordance with some embodiments.

FIG. 5 is a cross-sectional top view of optical system 34 of FIG. 4 in an example where peripheral light sources 40 are mounted to frame 58 (e.g., at locations 55 of FIG. 4 and as taken along line AA' of FIG. 4). As shown in FIG. 5, the lateral edges of waveguide 44 may be mounted to frame 58. Waveguide 44 may form optical combiner 38 that transmits world light 36W to eye box 24.

Waveguide 44 may include output coupler 50 (e.g., aligned with the center of the field of view of eye box 24). Waveguide 44 may also include input coupler 46 and optionally cross coupler 48 of FIG. 2 (not shown in FIG. 5 for the sake of clarity). Display module 30 (FIG. 2) may provide main display light 36M that is coupled into waveguide 44 (e.g., by the input coupler). Waveguide 44 may propagate main display light 36M via total internal reflection. Output coupler 50 may redirect main display light 36M towards eye box 24 (e.g., output coupler 50 may form part of main display 14M for device 10). Output coupler 50 may be formed from volume holograms or other diffractive grating structures in a grating medium that is embedded within waveguide 44, as one example.

In the example of FIG. 5, peripheral display 14P is formed as a part of optical system 34. For example, optical system 34 may include peripheral light sources 40A mounted to frame 58 at or adjacent to inward-facing surface 60 of waveguide 44. Peripheral light sources 40A may emit peripheral light 36P directly towards eye box 24 or, as shown in the example of FIG. 5, peripheral light 36P may scatter or reflect off of surface 60 towards eye box 24 (e.g., to form an alert within region 54 of FIG. 3). If desired, scattering structures or reflective structures may be formed on surface 60 of waveguide 44 to help direct peripheral light 36P towards eye box 24.

In another suitable arrangement, optical system 34 may include peripheral light sources 40B mounted to frame 58 at or adjacent to outward-facing surface 62 of waveguide 44. Peripheral light sources 40B may emit peripheral light 36P directly towards eye box 24 or, as shown in the example of FIG. 5, peripheral light 36P may scatter or refract at surface 62 towards eye box 24 (e.g., to form an alert within region 54 of FIG. 3). If desired, scattering structures or reflective structures may be formed on surface 62 of waveguide 44 to help direct peripheral light 36P towards eye box 24.

If desired, optical system 34 may include both peripheral light sources 40A and peripheral light sources 40B. Peripheral light sources 40A and 40B may run along some or all of the lateral periphery of waveguide 44 (e.g., at locations 55 of FIG. 4). Peripheral light sources 40A and 40B may include sets of peripheral light sources. In the arrangement of FIG. 5, peripheral light sources 40A and 40B each include sets of three peripheral light sources at any given location. Each light source in each set may emit light of a respective wavelength range (color) if desired. As an example, the peripheral light sources 40A and 40B in each set may emit red, green, and blue peripheral light 36P (e.g., to provide low resolution color images or alerts at eye box 24). Peripheral light sources 40 (e.g., peripheral light sources 40A and 40B of FIG. 5) may include OLEDs, LEDs, lasers, laser diodes, super luminescent LEDs, uLEDs, and/or any other desired light sources. Peripheral light sources 40A and 40B may be arranged in any desired pattern.

Figure 6:
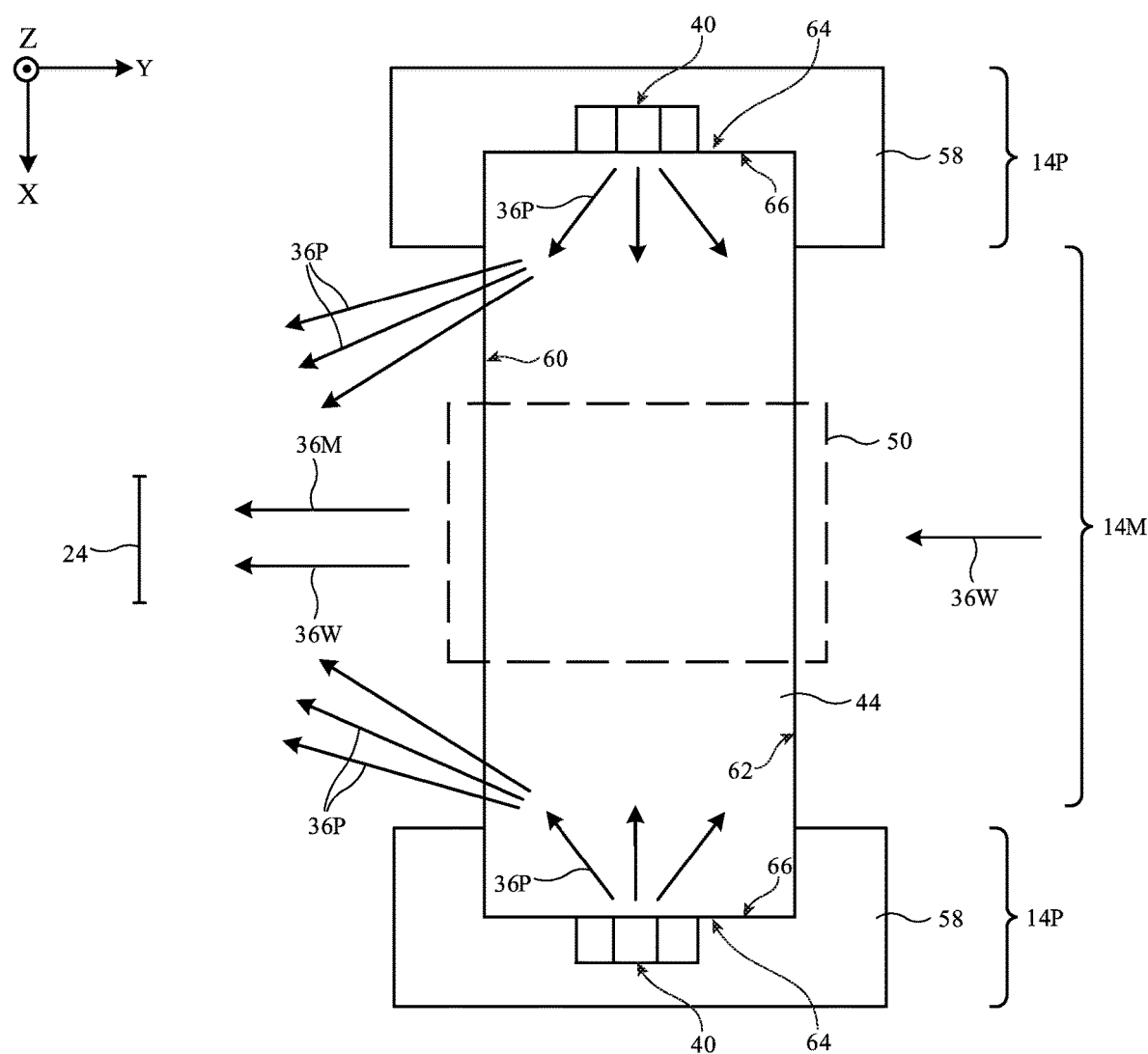
FIG. 6 is a cross-sectional top view of an illustrative optical system having peripheral display light sources that are mounted to a frame for a waveguide and that emit light into the waveguide in accordance with some embodiments.

In another suitable arrangement, peripheral light sources 40 may emit peripheral light 36P directly into the edges of waveguide 44, as shown in FIG. 6. As shown in FIG. 6, peripheral light sources 40 may be embedded within frame 58 (e.g., at interior edge 64 of frame 58). Peripheral light sources 40 may emit peripheral light 36P through interior edge 64 of frame 58 and outer (peripheral) edge 66 of waveguide 44. Peripheral light 36P may pass through waveguide 44 (e.g., in the −Y direction) to be received at eye box 24 (e.g., at the periphery of the field of view). If desired, light redirecting structures (e.g., scattering structures, optical channels, reflective structures, lenses, etc.) may be formed on or within waveguide 44 to help direct peripheral light 36P towards eye box 24.

Figure 7:
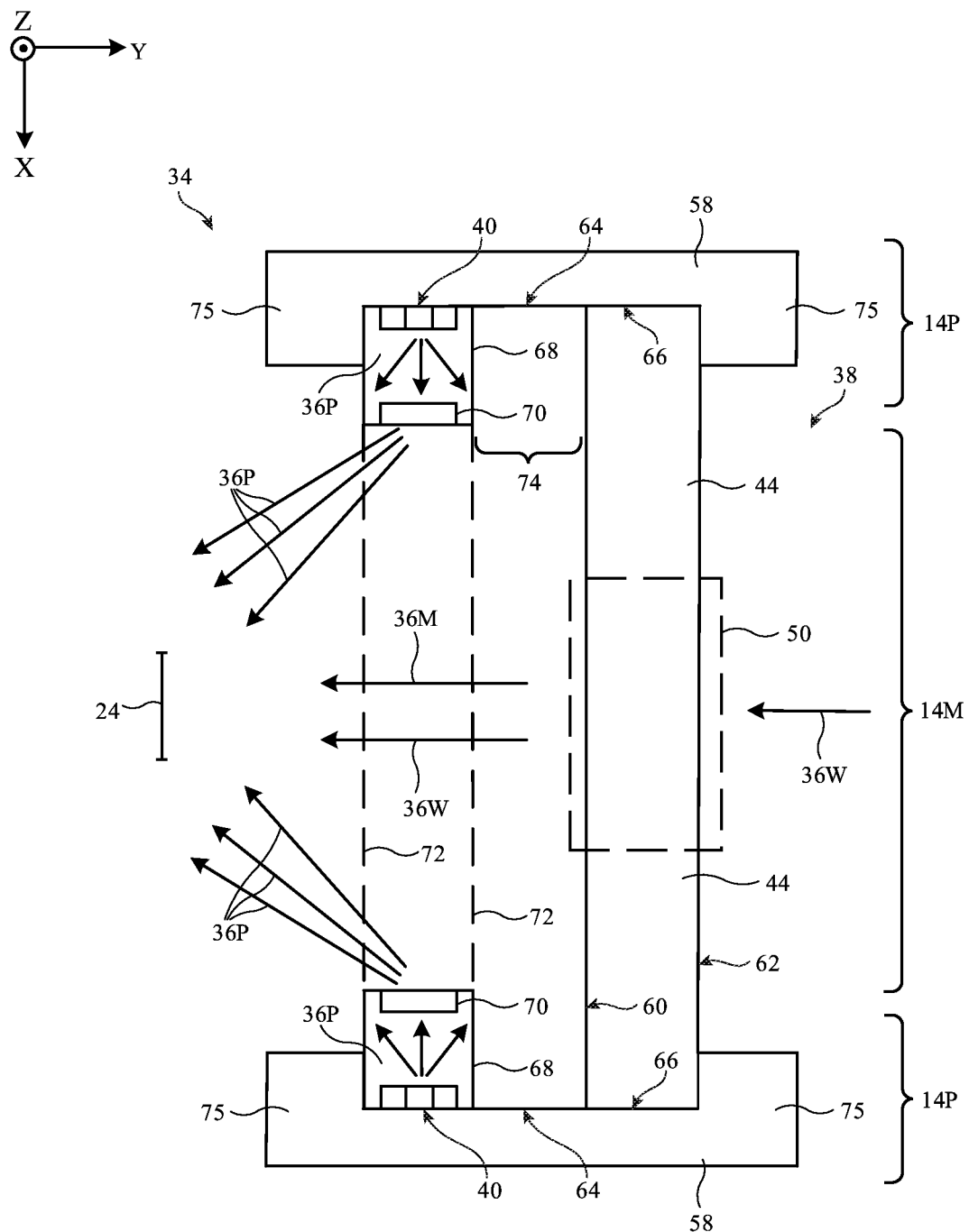
FIG. 7 is a cross-sectional top view of an illustrative optical system having a waveguide with an output coupler and a substrate with embedded peripheral display light sources mounted to a frame in accordance with some embodiments.

If desired, peripheral light sources 40 may be formed in a substrate that is separate from waveguide 44. FIG. 7 is a cross-sectional top view showing how optical system 34 may include a separate substrate for peripheral light sources 40. As shown in FIG. 7, peripheral edges 66 of waveguide 44 may be mounted to interior edge 64 of frame 58. Optical system 34 may also include an additional substrate such as substrate 68 that is mounted to interior edge 64 of frame 58. Additional substrate 68 may be formed from glass, plastic, polymer, or any other desired optically transparent material. Additional substrate 68 may be separated from waveguide 44 by gap 74. Gap 74 may be filled with air or other dielectric materials (e.g., additional optically transparent substrates, optically clear adhesive, spacer structures, etc.). If desired, gap 74 may be omitted (e.g., substrate 68 may directly contact surface 60 of waveguide 44).

In the arrangement of FIG. 7, substrate 68 is provided with a ring shape that laterally follows the ring shape of frame 58 (e.g., within the X-Z plane and as shown in FIG. 4) so that substrate 68 extends along and overlaps the lateral periphery of waveguide 44. In this arrangement, the ring shape of substrate 68 may laterally surround an opening that overlaps at least output coupler 50 on waveguide 44. This is merely illustrative and, if desired, substrate 68 may be formed from a continuous substrate that overlaps all of waveguide 44, as shown by lines 72 (e.g., substrate 68 may be continuous in the X-Z plane and/or disc-shaped). If desired, frame 58 may include one or more lip portions 75 that help to hide peripheral light sources 40 and/or substrate 68 from view (e.g., peripheral light sources 40 and/or substrate 68 may overlap lip portion 75 of frame 58).

As shown in FIG. 7, peripheral light sources 40 may be embedded within substrate 68 (e.g., at interior edge 64 of frame 58). As an example, substrate 68 may be molded over peripheral light sources 40. Peripheral light sources 40 may emit peripheral light 36P directly towards eye box 24. If desired, substrate 68 may include scattering structures such as diffusers 70. Diffusers 70 may overlap peripheral light sources 40. Diffusers 70 may scatter or reflect peripheral light 36P to help direct peripheral light 36P towards eye box 24. If desired, diffusers 70 may include diffractive grating structures (e.g., holograms) that diffract peripheral light 36P towards eye box 24 (e.g., diffusers 70 may be holographic diffusers). Diffusers 70 may be tinted if desired (e.g., to provide peripheral light 36P with a particular color at eye box 24). Diffusers 70 may be replaced with optical fibers in another suitable arrangement.

In the arrangement of FIGS. 5-7, peripheral light sources 40 are mounted at or adjacent to interior edge 64 of frame 58. This is merely illustrative. If desired, peripheral light sources 40 may be mounted within optical system 34 at or adjacent to the periphery of output coupler 50.

Figure 8:
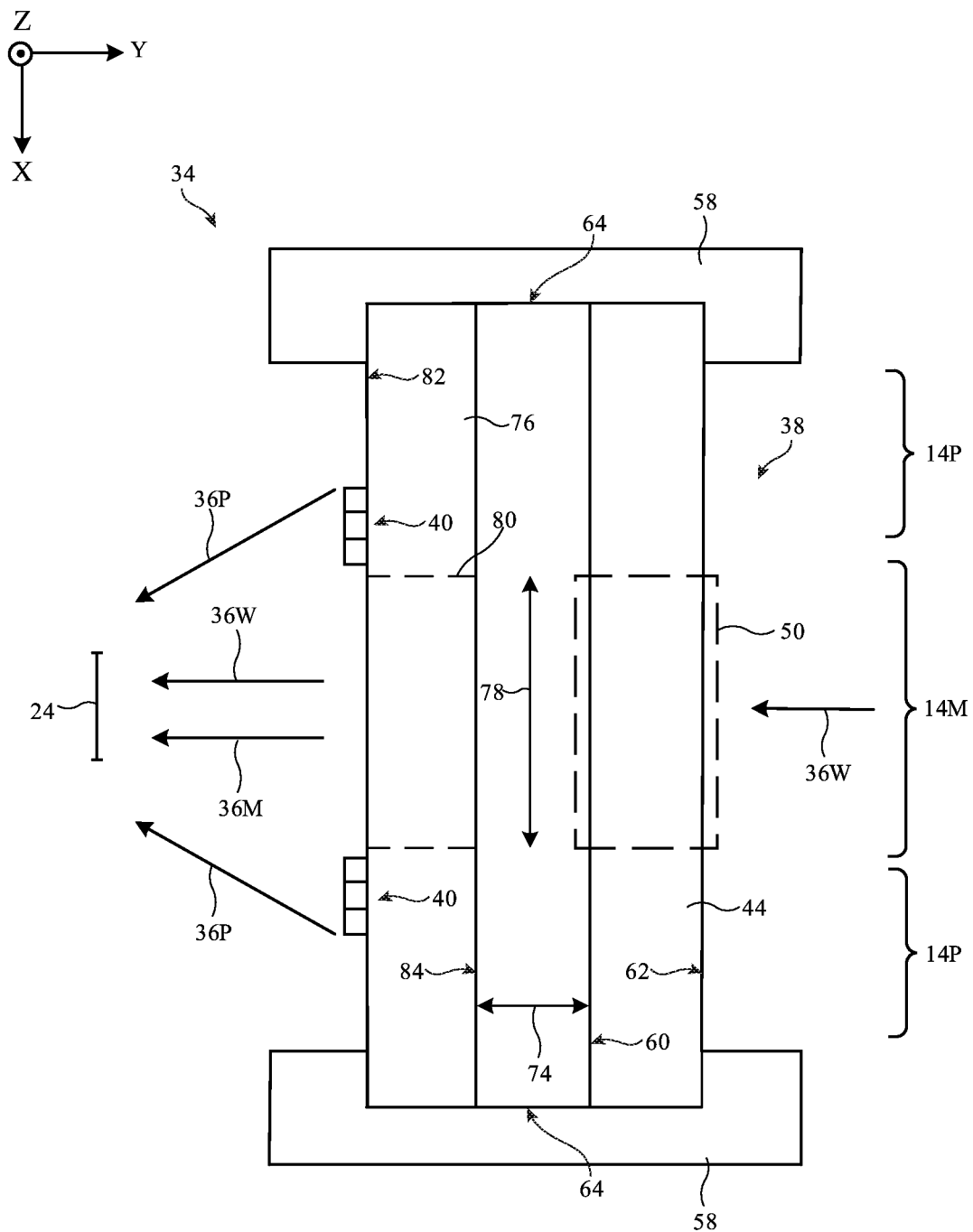
FIG. 8 is a cross-sectional top view of an illustrative optical system having a waveguide with an output coupler and a substrate with peripheral display light sources around a periphery of the output coupler in accordance with some embodiments.

FIG. 8 is a cross-sectional top view showing one example of how peripheral light sources 40 may be mounted at or adjacent to the periphery of output coupler 50. As shown in FIG. 8, optical system 34 may include an additional substrate such as substrate 76. Substrate 76 may be mounted to interior edge 64 of frame 58. Substrate 76 may be formed from glass, plastic, or other optically transparent materials. Substrate 76 may be separated from waveguide 44 by gap 74. Gap 74 may be filled with air or other dielectric materials (e.g., additional optically transparent substrates, optically clear adhesive, spacer structures, etc.). If desired, gap 74 may be omitted (e.g., substrate 76 may directly contact surface 60 of waveguide 44).

Substrate 76 may have a first surface 82 facing eye box 24 and an opposing second surface 84 facing waveguide 44. Substrate 76 may include a single layer of transparent (e.g., dielectric) material or multiple stacked layers of material. Substrate 76 may extend continuously between opposing interior edges 64 of frame 58 (e.g., substrate 76 may be continuously-extending between frame 58 and/or disc-shaped), such that substrate 76 completely overlaps waveguide 44 and output coupler 50. In another suitable arrangement, substrate 76 may have an opening 80 aligned with (e.g., overlapping) output coupler 50 on waveguide 44. Output coupler 50 may have a corresponding field of view 78 (e.g., a field of view of eye box 24 for receiving main display light 36M and corresponding to a width of field of view 52 of FIG. 3). Output coupler 50 may couple main display light 36M out of waveguide 44 and to eye box 24 through substrate 76 or opening 80 (e.g., within field of view 78). World light 36W may also be received by eye box 24 through substrate 76 and/or opening 80.

As shown in FIG. 8, peripheral light sources 40 may be mounted to surface 82 of substrate 76 at or adjacent to the periphery of field of view 78 (e.g., at locations 57 of FIG. 4 and at or adjacent to opening 80 in scenarios where substrate 76 is ring-shaped and includes opening 80, overlapping the periphery of output coupler 50 or a portion of waveguide 44 extending around the periphery of output coupler 50, etc.). Peripheral light sources 40 may emit peripheral light 36P towards eye box 24 (e.g., within region 54 of FIG. 3). Lenses, microstructures, reflectors, scattering elements, diffusers, or other optical components may be used to help direct peripheral light 36P towards eye box 24 if desired.

Figure 9:
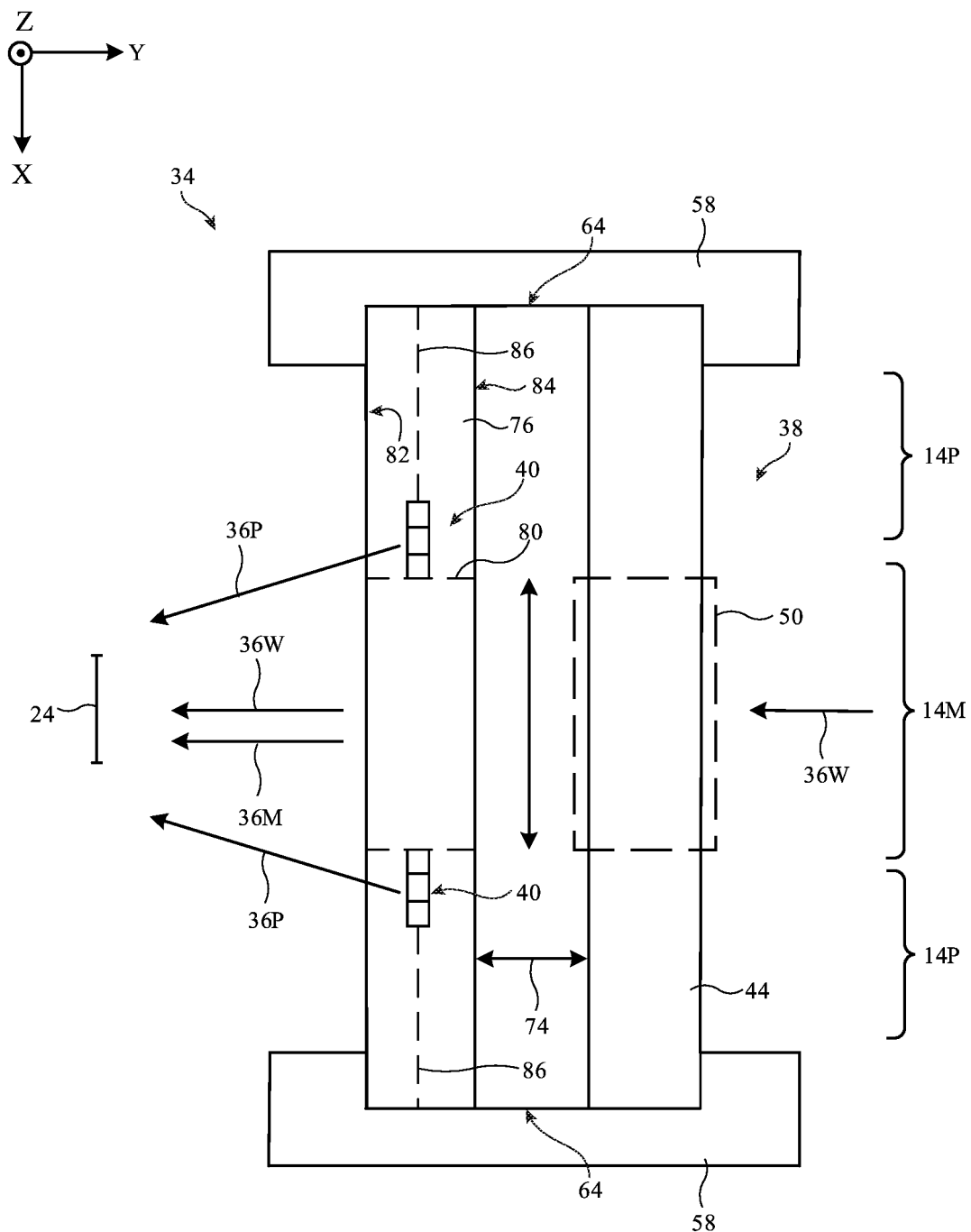
FIG. 9 is a cross-sectional top view of an illustrative optical system having a waveguide with an output coupler and a substrate with embedded peripheral display light sources around a periphery of the output coupler in accordance with some embodiments.

The example of FIG. 8 in which peripheral light sources 40 are mounted to surface 82 of substrate 76 is merely illustrative. In another suitable arrangement, peripheral light sources 40 may be embedded within substrate 76, as shown in FIG. 9. As shown in FIG. 9, peripheral light sources 40 may be embedded within substrate 76. Peripheral light sources 40 may, for example, be mounted to a transparent layer of substrate 76. A polymer such as an ultra-violet curable adhesive may be layered over peripheral light sources 40 and the transparent layer to encapsulate peripheral light sources 40 within substrate 76. Transparent conductive lines such as transparent conductive lines 86 may be patterned (e.g., embedded) on substrate 76 for controlling peripheral light sources 40 (e.g., without blocking real world light 36W). In this scenario, peripheral light sources 40 may be transparent (e.g., transparent uLEDs, transparent OLEDs, lasers, mini LEDs, etc.) so as not to undesirably block world light 36W.

The examples of FIGS. 5-9 in which peripheral light sources 40 of peripheral display 14P are mounted to frame 58 or an additional substrate overlapping waveguide 44 is merely illustrative. In another suitable arrangement, substrate 76 may be free from peripheral light sources 40 and peripheral display 14P may include a low resolution projector that projects and reflects peripheral light 36P off of substrate 76.

Figure 10:
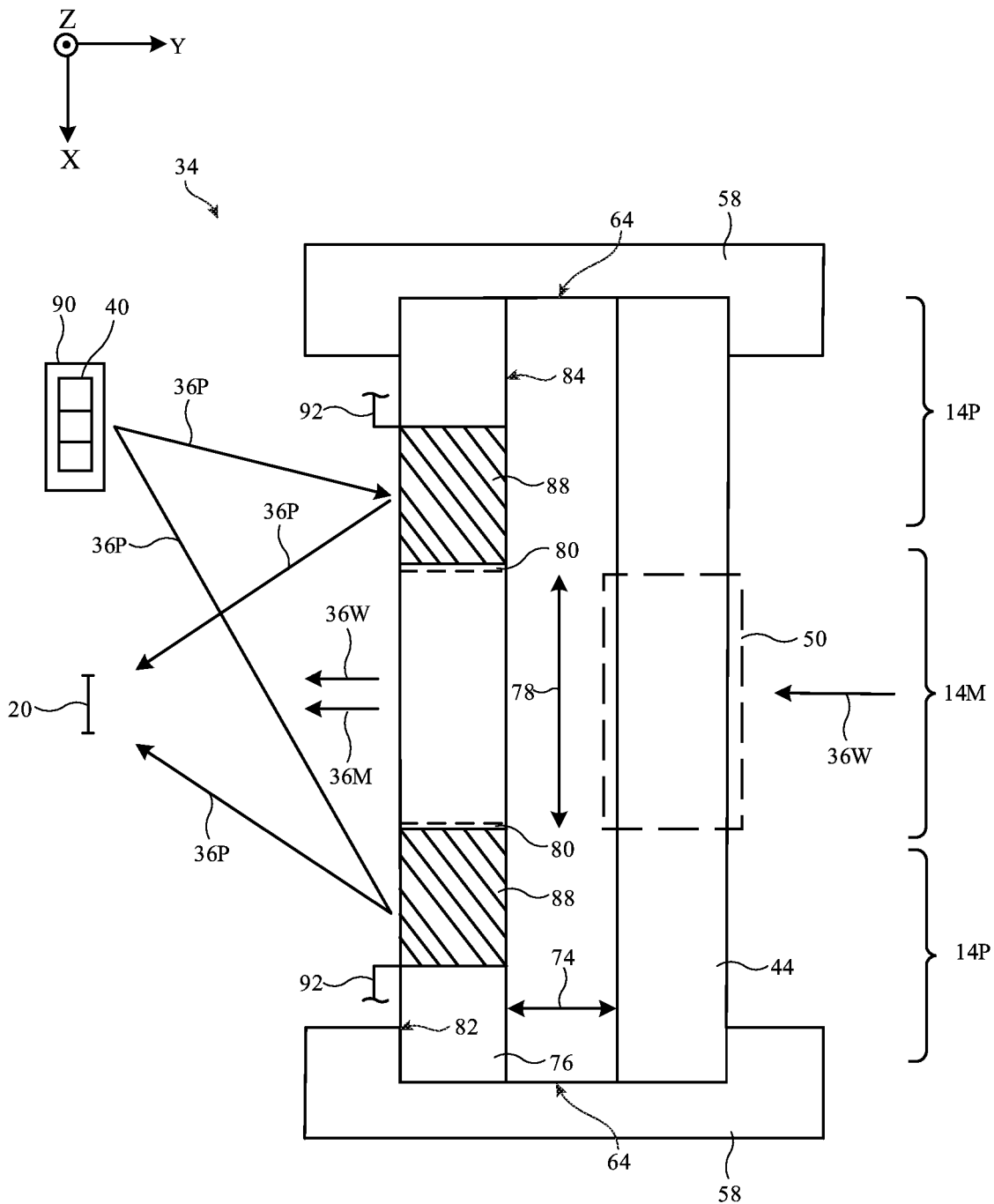
FIG. 10 is a cross-sectional top view of an illustrative optical system having a waveguide with an output coupler and a peripheral display projector that projects peripheral display light to switchable reflective structures on a substrate and surrounding a periphery of the output coupler in accordance with some embodiments.

FIG. 10 is a cross-sectional top view showing how peripheral light sources 40 may be formed in a low resolution projector. As shown in FIG. 10, optical system 34 may include a low resolution projector such as projector 90. Peripheral light sources 40 may be formed in projector 90. Projector 90 may include optics (e.g., lenses, prisms, optical couplers, diffractive gratings, mirrors, a DMD panel, an LCOS panel, a uLED panel, an OLED panel, lasers, etc.) that produce and/or direct peripheral light 36P towards substrate 76. Substrate 76 may include reflective structures 88 that run around the periphery of field of view 78 (e.g., at locations 57 of FIG. 4). Reflective structures 88 may, for example, extend continuously around field of view 78.

Low resolution projector 90 may direct peripheral light 36P from peripheral light sources 40 to reflective structures 88 on substrate 76. If desired, reflective structures 88 may include a switchable liquid crystal layer (e.g., a switchable mirror formed from liquid crystal structures). The switchable liquid crystal layer in reflective structures 88 may be adjusted by control signals on control path 92 between first and second states. In the first state, the switchable liquid crystal may absorb or block peripheral light 36P. In the second state, the switchable liquid crystal layer may reflect peripheral light 36P towards eye box 24 (e.g., within region 54 of FIG. 3). By controlling the state of the switchable liquid crystal layer in reflective structures 88 and/or peripheral light sources 40, control circuitry 16 (FIG. 1) may control when peripheral display 14P displays peripheral light 36P to the eye box and/or may control the pattern of the peripheral light 36P provided to the eye box.

Figure 11:
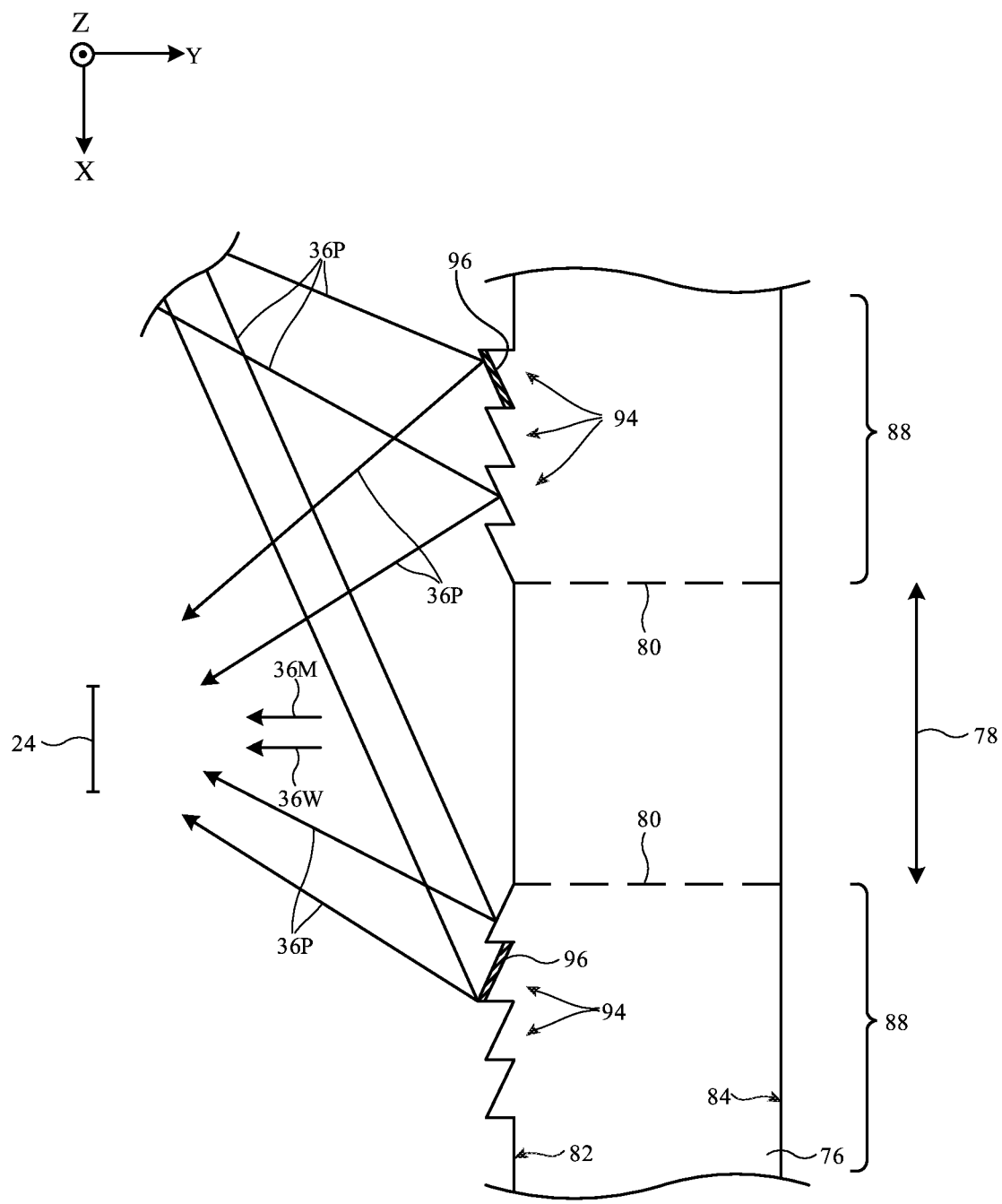
FIG. 11 is a cross-sectional top view showing how an illustrative peripheral display projector of the type shown in FIG. 10 may project peripheral display light to fixed reflective structures at a surface of a substrate in accordance with some embodiments.

The example of FIG. 10 in which reflective structures 88 include a switchable liquid crystal layer is merely illustrative. In another suitable arrangement, reflective structures 88 may include microstructures formed on surface 82 of substrate 76. FIG. 11 is a diagram showing how reflective structures 88 may include microstructures formed on surface 82 of substrate 76.

As shown in FIG. 11, surface 82 of substrate 76 may be patterned to form microstructures 94. Microstructures 94 may include a diffuser or, as shown in the example of FIG. 11, may include micro reflectors formed from angled surfaces (e.g., grooves or notches) patterned on surface 82. The micro reflectors may be angled to reflect incident peripheral light 36P from projector 90 (FIG. 10) towards eye box 24. The micro reflectors may be provided at different angles along the lateral area of surface 82 to ensure that peripheral light 36P is reflected at a suitable angle to be provided to eye box 24 within region 54 of FIG. 3, regardless of the incident angle of the peripheral light on surface 82.

If desired, one or more of the micro reflectors (e.g., microstructures 94) may be provided with a coating such as coating 96. Coating 96 may help to increase the amount of reflection that occurs at microstructures 94 (e.g., coating 96 may help to tune the reflectivity of microstructures 94). If desired, coating 96 may reflect some wavelengths of light more than others so that peripheral light 36P is provided to eye box 24 with a desired color. Any desired number of microstructures 94 may be provided in surface 82 in any desired pattern. Microstructures 94 may have other shapes (e.g., curved shapes, free form shapes, shapes having multiple curved and/or straight segments, etc.). Microstructures 94 may be formed from additional structures (e.g., angled reflectors) that are mounted to surface 82 if desired (e.g., microstructures 94 need not be formed from surface 82).

Figure 12:
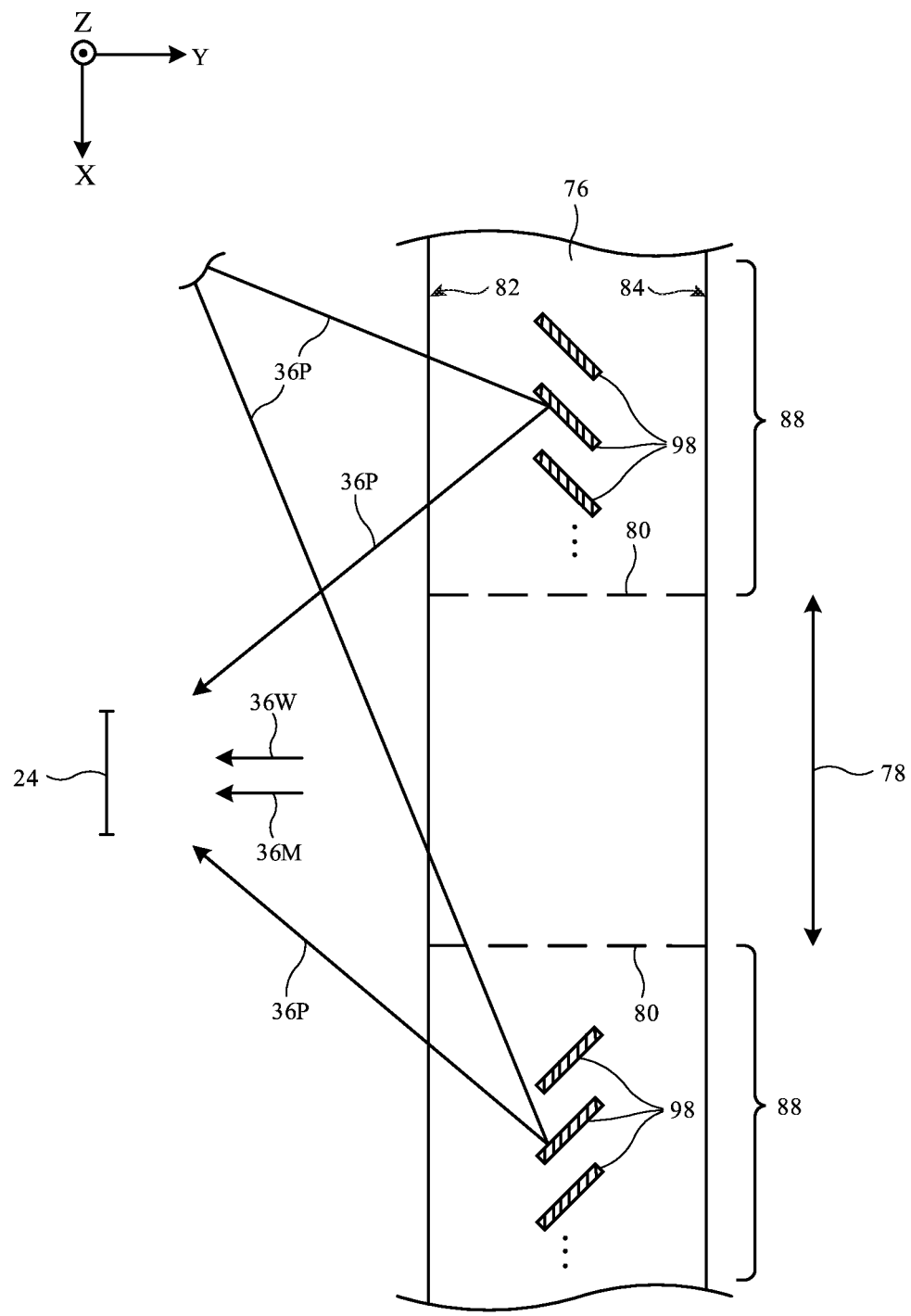
FIG. 12 is a cross-sectional top view showing how an illustrative peripheral display projector of the type shown in FIG. 10 may project peripheral display light to fixed reflective structures embedded within a substrate in accordance with some embodiments.

In another suitable arrangement, reflective structures 88 may include partial reflectors embedded within substrate 76. FIG. 12 is a diagram showing how reflective structures 88 may include partial reflectors embedded within substrate 76.

As shown in FIG. 12, reflective structures 88 may include angled partial reflectors 98 embedded within substrate 76. Angled partial reflectors 98 may be formed from dielectric and/or conductive materials. As an example, angled partial reflectors 98 may be formed in substrate 76 by first cutting an angled edge onto a sheet of material used to form substrate 76, depositing a partially reflective coating on the angled edge, and re-assembling the sheet or over-molding additional material from substrate 76 over the deposited coating. Angled partial reflectors 98 may be partially reflective or completely reflective and may, if desired, transmit world light 36W (e.g., so that angled partial reflectors 98 do not block world light 36W from passing through substrate 76). Angled partial reflectors 98 may at least partially overlap one or more other angled partial reflectors 98 or may be separated from one or two adjacent partial reflectors 98 by a gap (e.g., to allow more world light to pass through substrate 76 unimpeded).

Angled partial reflectors 98 may be angled to reflect incident peripheral light 36P from projector 90 (FIG. 10) towards eye box 24. Each angled partial reflector 98 may be provided at a different angle along the lateral area of substrate 76 to ensure that peripheral light 36P is reflected at a suitable angle to be provided to eye box 24 within region 54 of FIG. 3, regardless of where the peripheral light is incident on surface 82.

Figure 13:
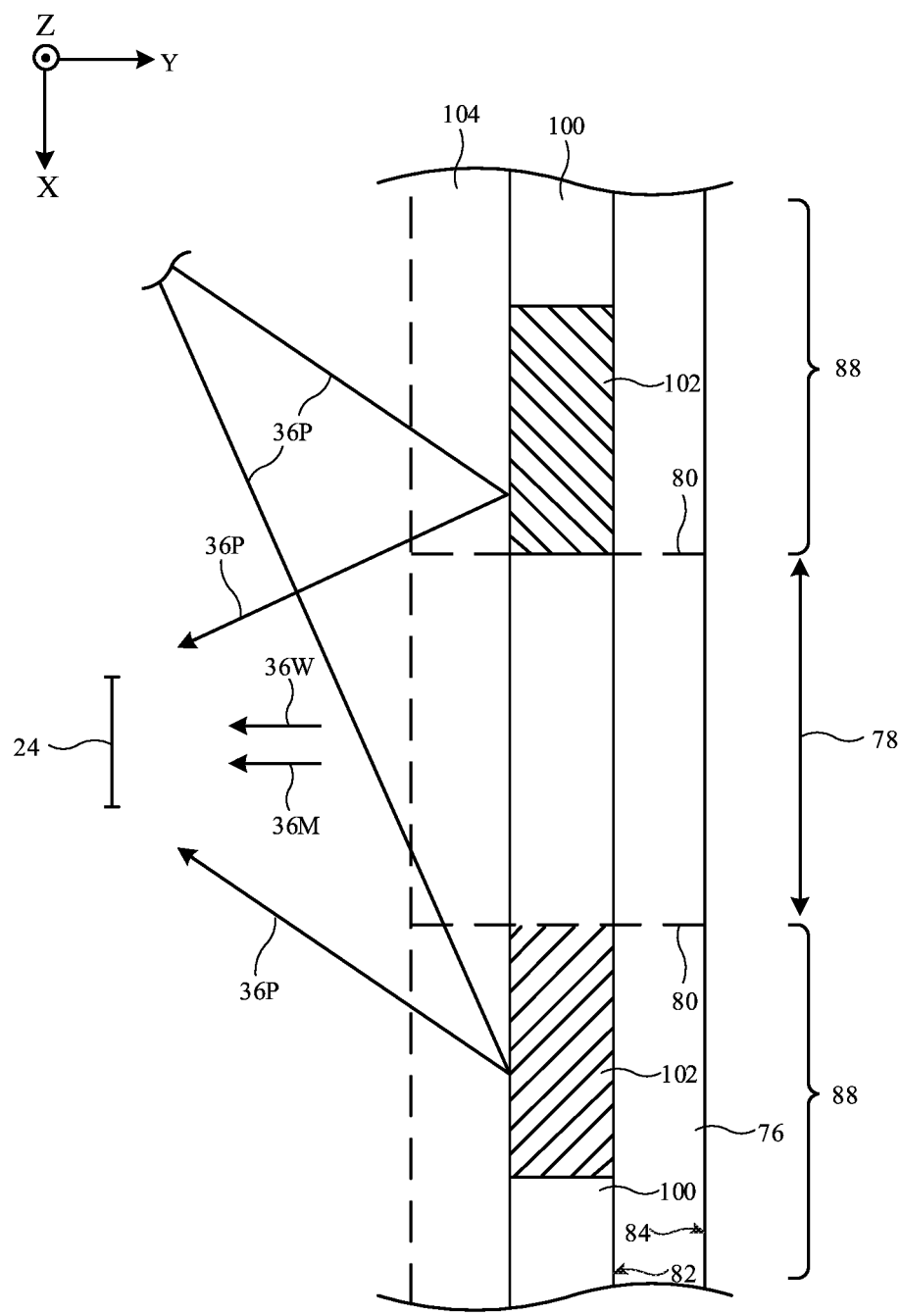
FIG. 13 is a cross-sectional top view showing how an illustrative peripheral display projector of the type shown in FIG. 10 may project peripheral display light to diffractive grating structures on a substrate in accordance with some embodiments.

If desired, reflective structures 88 may include diffractive grating structures on substrate 76. FIG. 13 is a diagram showing how reflective structures 88 may include diffractive grating structures on substrate 76.

As shown in FIG. 13, a layer of holographic recording medium such as grating medium 100 may be layered over surface 82 of substrate 76. Diffractive grating structures 102 may be recorded in grating medium 100 (e.g., within reflective structures 88). If desired, an optional transparent substrate layer 104 may be layered over grating medium 100. Diffractive grating structures 102 may include thin film holograms, volume holograms, or other gratings. The gratings in diffractive grating structures 102 may include multiple multiplexed gratings (e.g., at least partially overlapping holograms superimposed within the same volume of grating medium). The multiplexed gratings may diffract different incident angle ranges and wavelengths at different respective output angles (e.g., towards eye box 24).

Diffractive grating structures 102 may be configured (e.g., recorded) to diffract peripheral light 36P towards eye box 24. Different gratings may be multiplexed across the lateral area of grating medium 100 to ensure that peripheral light 36P is reflected at a suitable angle to be provided to eye box 24 within region 54 of FIG. 3, regardless of where the peripheral light is incident on grating medium 100. In another suitable arrangement, diffractive grating structures 102 may include surface relief gratings, meta gratings, patterns of three-dimensional metal structures on surface 82, etc. Diffractive grating structures 102 may not be Bragg-matched to world light 36W or main display light 36M so that world light 36W and main display light 36M pass through grating medium 100 without diffraction (loss). Diffractive grating structures 102 may be recorded within grating medium 100 only around the periphery of field of view 78 or may extend over field of view 78 (e.g., in scenarios where opening 80 is not formed in substrate 76, grating medium 100, and optional layer 104).

Figure 14:
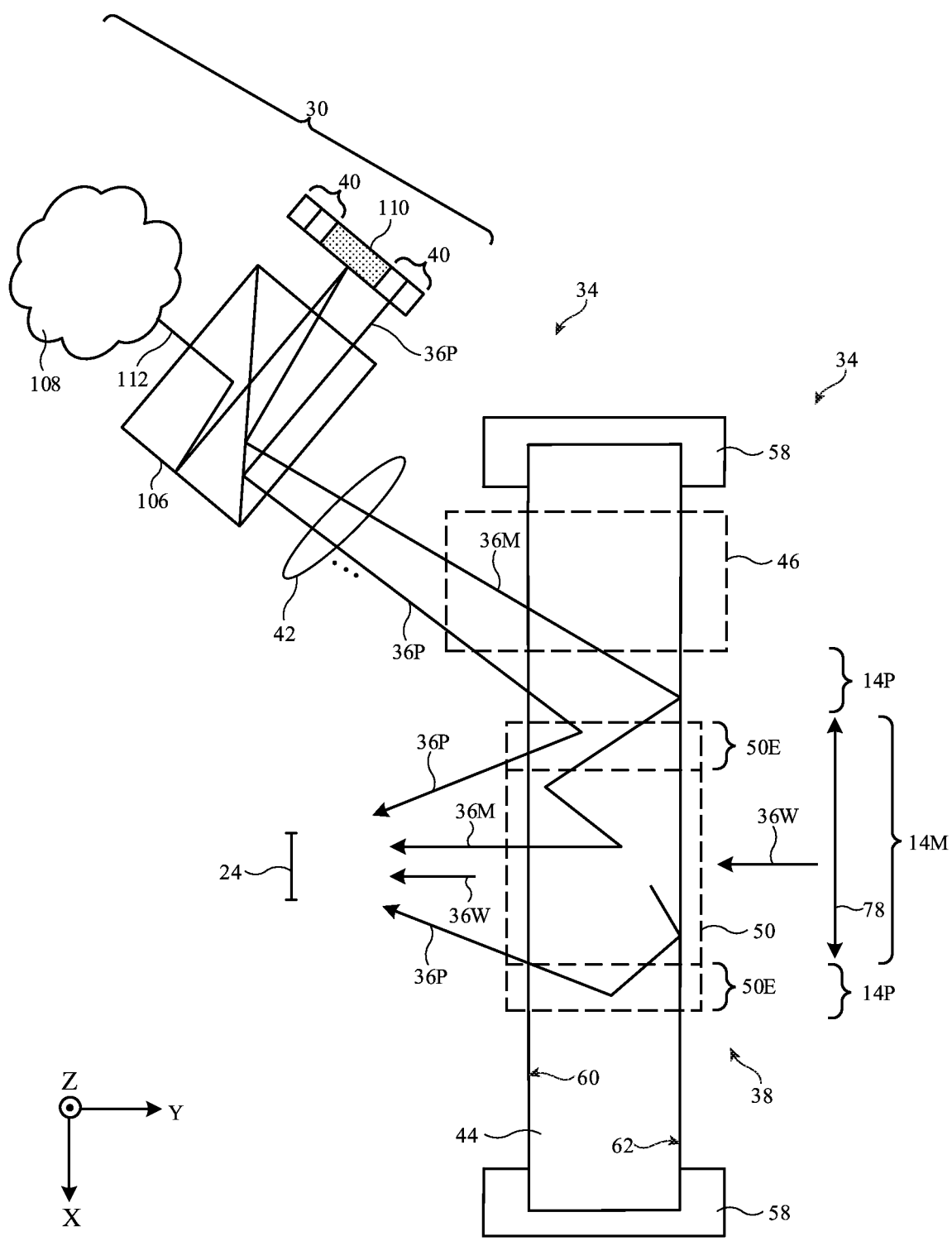
FIG. 14 is a cross-sectional top view showing how an illustrative reflective display module may include peripheral display light sources that provide peripheral display light to an output coupler in a waveguide in accordance with some embodiments.

The examples of FIGS. 5-13 in which peripheral light sources 40 are formed in optical system 34 are merely illustrative. If desired, peripheral light sources 40 may be formed within display module 30 of main display 14M (FIG. 1). FIG. 14 is a diagram showing how peripheral light sources 40 may be formed within display module 30 of main display 14M in an example where display module 30 is a reflective-type display.

As shown in FIG. 14, display module 30 may provide both main display light 36M and peripheral display light 36P to input coupler 46 on waveguide 44. Input coupler 46 may couple main display light 36M and peripheral light 36P into waveguide 44 such that the light propagates down the length of the waveguide (e.g., in the X direction) via total internal reflection. Input coupler 46 may couple main display light 36M into waveguide 44 at angles such that main display light 36M hits output coupler 50 and is coupled out of waveguide 44 (e.g., towards eye box 24) by output coupler 50 (e.g., within field of view 78). Output coupler 50 may also transmit world light 36W to eye box 24.

In the example of FIG. 14, display module 30 is a reflective-type display module having illumination optics 108, prism 106, and reflective display panel 110. Display panel 110 may be a digital micromirror device (DMD) panel, a liquid crystal on silicon (LCOS) panel, or other types of reflective display panels (e.g., spatial light modulators). Illumination optics 108 may include one or more light sources, prisms, lenses, or other optical components. Illumination optics 108 may emit display illumination 112 (e.g., illumination for main display 14M). Display illumination 112 may be provided within one or more wavelength ranges. As an example, illumination optics 108 may include light sources that emit light of at least three colors in display illumination 112 (e.g., display illumination 112 may include a combination of red light, green light, and blue light emitted from different light sources in illumination optics 108). The light sources in illumination optics 108 may be LEDs, OLEDs, uLEDs, lasers, or any other desired light sources.

Prism 106 may direct display illumination 112 towards display panel 110. Display panel 110 may include pixels that reflect main display illumination light as main display light 36M (e.g., each pixel may be selectively turned on when that pixel is active to produce a corresponding image in main display light 36M). Prism 106 may direct main display light 36M to collimating optics 42, which directs main display light 36M to input coupler 46.

Display module 30 may include peripheral light sources 40 for peripheral display 14P. Peripheral light sources 40 may be mounted around the periphery of display panel 110 (e.g., around one, more than one, or all sides of the lateral area of display panel 110). Peripheral light sources 40 may emit peripheral light 36P. Prism 106 may direct peripheral light 36P to collimating optics 42, which direct peripheral light 36P to input coupler 46.

Output coupler 50 may include extended portions (regions) 50E at its periphery. Extended portions 50E of output coupler 50 may extend beyond field of view 78 and may not operate on main display light 36M (e.g., extended portions 50E may include diffractive grating structures that are not Bragg matched to the incident angles and/or wavelengths of main display light 36M at output coupler 50). Extended portions 50E may, for example, be formed at the periphery of output coupler 50 (e.g., output coupler 50 of FIG. 14 may be wider in the X direction than output coupler 50 in the examples of FIGS. 5-10 by the width of extended portions 50E).

Extended portions 50E may include diffractive grating structures (or mirrors in scenarios where output coupler 50 is formed from a louvered mirror) that are different from those within the remainder of output coupler 50. The diffractive grating structures in extended portions 50E may, for example, be recorded within the same layer of grating medium in waveguide 44 as the diffractive grating structures within field of view 78 that couple main display light 36M out of waveguide 44 (e.g., different holograms may be multiplexed across the area of output coupler 50). However, the diffractive grating structures in extended portions 50E may be Bragg matched to peripheral light 36P at the incident angles and wavelengths of peripheral light 36P as coupled into waveguide 44 by input coupler 46. This may configure the diffractive grating structures in extended portions 50E to couple peripheral light 36P out of waveguide 44 and towards eye box 24 (e.g., within region 54 of FIG. 3).

In the example of FIG. 14, peripheral light sources 40 may be selectively activated to produce peripheral light 36P around some or all of the field of view of output coupler 50 (e.g., to display a particular pattern of light around the field of view as needed). This example is merely illustrative. In another suitable arrangement, peripheral light sources 40 may be formed within illumination optics 108 of display module 30.

Figure 15:
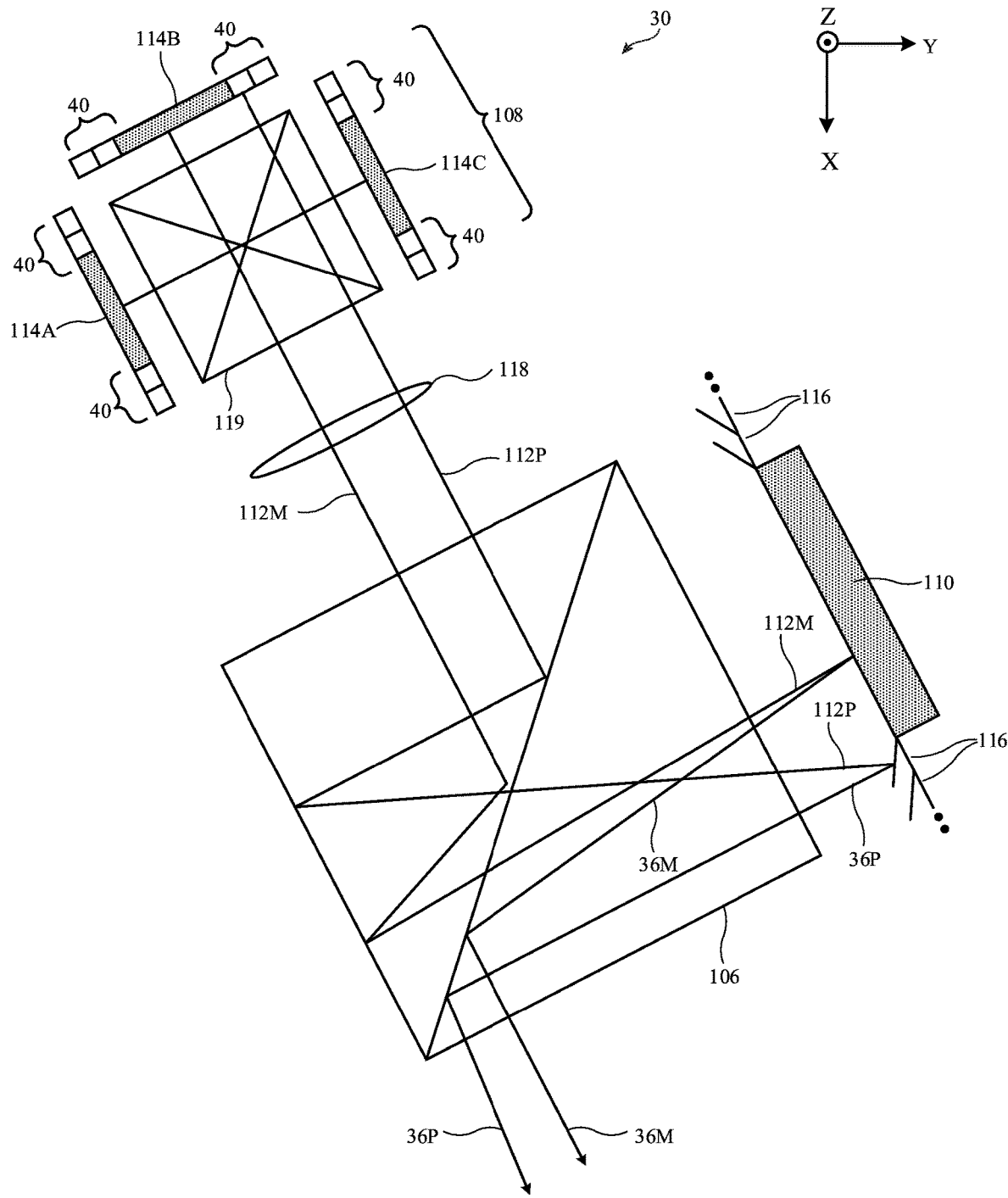
FIG. 15 is a cross-sectional top view showing how illustrative peripheral display light sources may be provided within the illumination optics of a reflective display module for providing peripheral display light to an output coupler in a waveguide in accordance with some embodiments.

FIG. 15 is a diagram showing one example of how peripheral light sources 40 may be formed within illumination optics 108 of display module 30. As shown in FIG. 15, illumination optics 108 may include one or more arrays of light sources 114 for main display 14M. For example, illumination optics 108 may include a first array of light sources 114A that emits main display illumination 112M of a first color such (e.g., red light), a second array of light sources 114B that emits main display illumination 112M of a second color (e.g., green light), and a third array of light sources 114C that emits main display illumination 112M of a third color (e.g., blue light).

Illumination optics 108 may include prism 119 and zero, one, or more than one illumination lens 118. Prism 119 may combine the main display illumination 112M emitted by each array of light sources 114 and may provide main display illumination 112M to lens 118. Lens 118 may direct main display illumination 112M to prism 106, which directs main display illumination 112M to display panel 110. This example is merely illustrative and, in general, illumination optics 108 may include any desired light sources in any desired arrangement for producing main display illumination 112M.

As shown in FIG. 15, illumination optics 108 may include peripheral light sources 40 for peripheral display 14P. Peripheral light sources 40 may be mounted around the periphery of one, more than one, or each array of light sources 114 in illumination optics 108 (e.g., along one, more than one, or all sides of each respective array of light source 114). Peripheral light sources 40 may emit peripheral display illumination 112P. In one suitable arrangement, the peripheral light sources 40 around each array of light sources 114 may emit peripheral display illumination 112P of one or more different colors.

An array of fixed mirrors 116 may be mounted at the periphery of display panel 110 (e.g., along one, more than one, or all sides of display panel 110). Fixed mirrors 116 may, for example, be provided at different non-zero angles relative to the lateral surface of display panel 110. Prism 119 may combine the peripheral display illumination 112P produced by each peripheral light source 40 and may direct peripheral display illumination 112P to lens 118. Lens 118 may direct peripheral display illumination 112P to prism 106. Prism 106 may direct peripheral display illumination 112P towards fixed mirrors 116 (e.g., each fixed mirror 116 may be configured to receive light from a respective peripheral light source 40 in illumination optics 108).

Fixed mirrors 116 may reflect peripheral display illumination 112P to produce peripheral display light 36P. Prism 106 may direct peripheral display light 36P towards input coupler 46 (FIG. 14). Fixed angle mirrors 116 may produce peripheral light 36P at angles such that peripheral light 36P is coupled into waveguide 44 by input coupler 46 at angles such that the peripheral light 36P will be coupled out of waveguide 44 by extended portions 50E of output coupler 50. In another suitable arrangement, display panel 110 may be increased in size to also include switchable mirrors that selectively reflect peripheral display illumination 112P to produce peripheral light 36P. However, switchable mirrors in display panel 110 may consume a relatively high amount of power. Using fixed angle mirrors 116 may minimize the power requirements to implement display module 30 relative to these scenarios.

In the example of FIG. 15, peripheral light sources 40 may be selectively activated to produce peripheral light 36P around some or all of the field of view of output coupler 50 (e.g., to display a particular pattern of light around the field of view as needed). This example is merely illustrative. In another suitable arrangement, peripheral light sources 40 may remain in an "ON" state (e.g., may continuously emit peripheral display illumination 112P) and a switchable liquid crystal panel may be used to selectively provide peripheral light 36P to input coupler 46.

Figure 16:
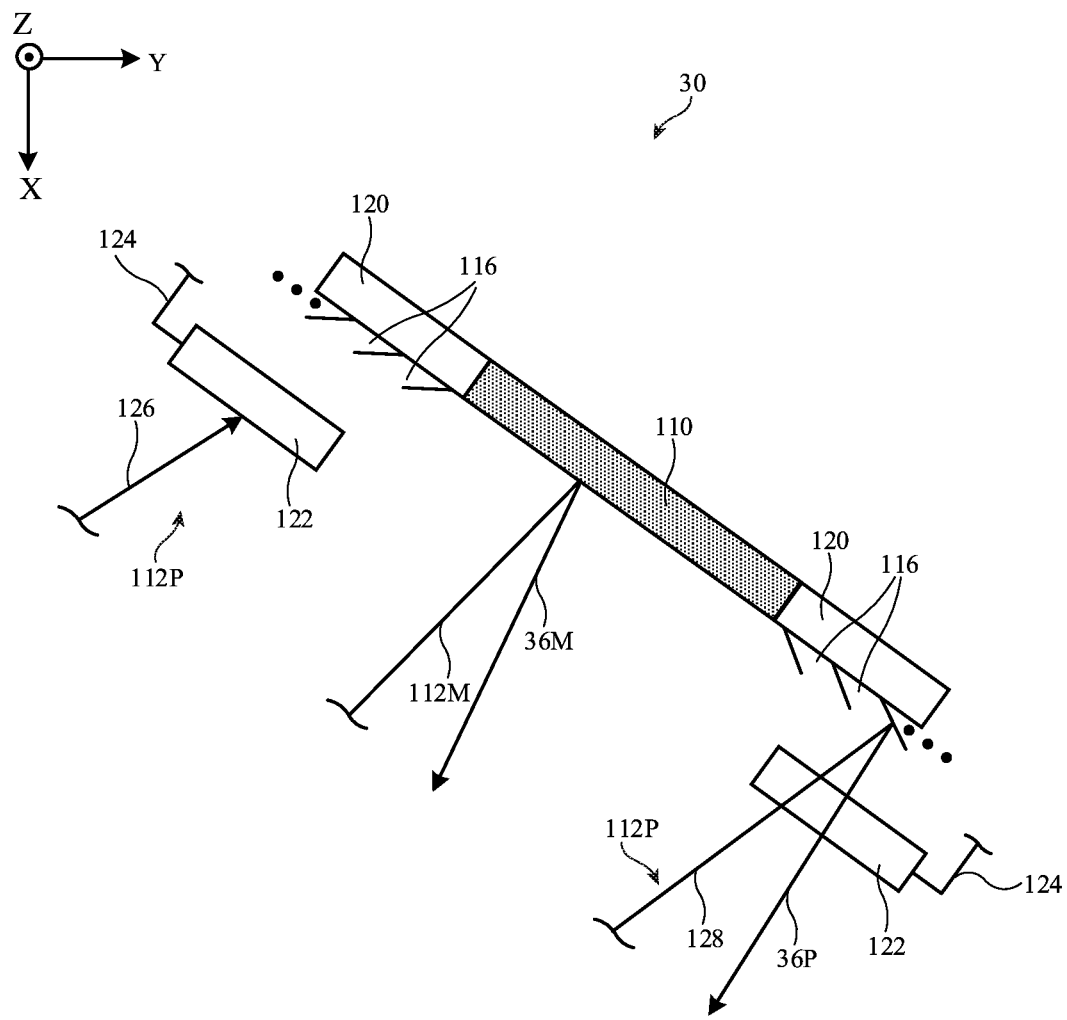
FIG. 16 is a cross-sectional top view showing how an illustrative switchable shutter may be used to selectively provide light from peripheral display light sources to reflective structures around a periphery of a reflective display panel in accordance with some embodiments.

FIG. 16 is a diagram showing how display module 30 may include a switchable liquid crystal panel to selectively provide peripheral light 36P to input coupler 46. As shown in FIG. 16, a switchable liquid crystal panel such as liquid crystal panel 122 may be provided overlapping fixed mirrors 116. Fixed mirrors 116 may be formed on support structures 120 (e.g., support structures that are also used to support display panel 110).

Liquid crystal panel 122 may be adjusted, using control signals on control paths 124, between first and second states. In the first state, liquid crystal panel 122 may be opaque. This may block incident peripheral display illumination 112P from passing to fixed mirrors 116, as shown by ray 126, so that no peripheral light 36P is provided to waveguide 44. In the second state, liquid crystal panel 122 may be transparent. This may transmit peripheral display illumination 112P to fixed mirrors 116, as shown by ray 128, so that fixed mirrors 116 produce peripheral light 36P that is provided to waveguide 44. By adjusting liquid crystal panel 122 between the first and second states, a desired pattern of peripheral light 36P may be provided to the eye box. If desired, multiple independently controlled liquid crystal panels 122 may be provided over fixed mirrors 116 (e.g., for respective pixels of peripheral display 14P) so that some mirrors 116 may be used to produce peripheral light 36P while other mirrors do not produce peripheral light 36P (e.g., to produce a desired pattern of peripheral light 36P at the eye box). Switchable liquid crystal panel 122 may have additional states each with varying levels of opacity (e.g., so switchable liquid crystal panel 122 may produce peripheral light 36P at different intensities). In this way, liquid crystal panel 122 may form a switchable amplitude mask for peripheral light 36P.

Figure 17:
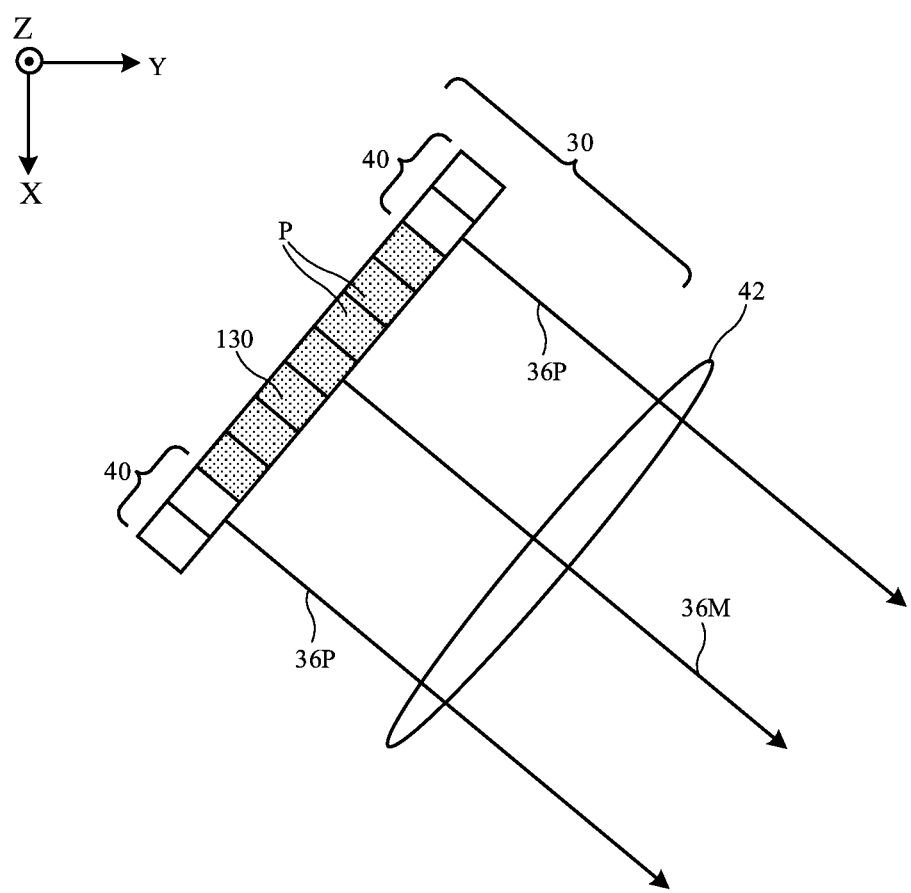
FIG. 17 is a cross-sectional top view showing how illustrative peripheral display light sources may be formed around a periphery of an emissive display panel in accordance with some embodiments.

The example of FIGS. 14-16 in which display module 30 is a reflective-type display module is merely illustrative. In another suitable arrangement, display module 30 may be an emissive-type display module. FIG. 17 is a diagram showing how display module 30 may be an emissive-type display module.

As shown in FIG. 17, display module 30 may include emissive display panel 130. Display panel 130 may include, for example, a uLED array, an LED array, an OLED array, an array of lasers, etc. Display panel 130 may emit main display light 36M. Collimating optics 42 may direct main display light 36M towards input coupler 46 (FIG. 14). Peripheral light sources 40 may be mounted around the periphery of display panel 130 (e.g., along one, more than one, or all sides of the lateral area of display panel 130). Peripheral light sources 40 may emit peripheral light 36P. Collimating optics 42 may direct peripheral light 36P towards input coupler 46 (e.g., at positions and/or angles such that peripheral light 36P is coupled into waveguide 44 by input coupler 46 at angles such that the peripheral light 36P will be coupled out of waveguide 44 by extended portions 50E of output coupler 50).

Figure 18:
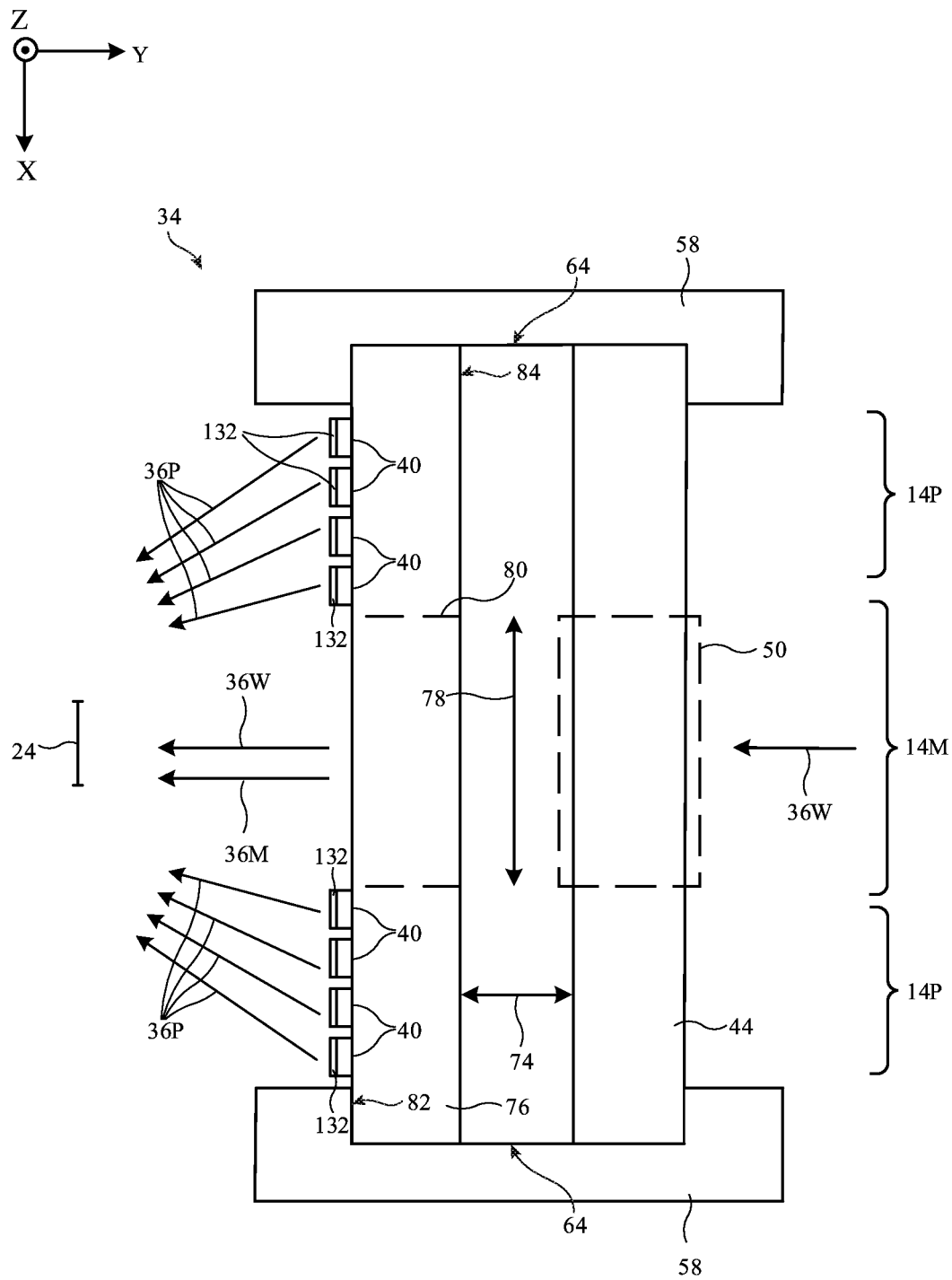
FIG. 18 is a cross-sectional top view of an illustrative optical system having a waveguide with an output coupler and a substrate with peripheral display light sources that fill an area of the substrate between a frame and a periphery of the output coupler in accordance with some embodiments.

If desired, peripheral light sources 40 may be formed on substrate 76 (FIGS. 8-13) and may fill an area of substrate 76 between frame 58 and the field of view of output coupler 50. FIG. 18 is a cross-sectional top view showing how peripheral light sources 40 may be formed on substrate 76 (FIGS. 8-13) and may fill an area of substrate 76 between frame 58 and the field of view of output coupler 50.

As shown in FIG. 18, peripheral light sources 40 may be mounted to surface 82 of substrate 76. Peripheral light sources 40 may fill the lateral area of substrate 76 between field of view 78 and frame 58 (e.g., at locations 59 and 57 and regions between locations 57 and 59 of FIG. 4). Peripheral light sources 40 may emit peripheral light 36P towards eye box 24 (e.g., within region 54 of FIG. 3). If desired, peripheral light sources 40 may be provided with microstructures 132. Microstructures 132 may include lenses, diffusers, scattering structures, reflectors, and/or other structures that help to direct peripheral light 36P towards eye box 24.

Figure 19:
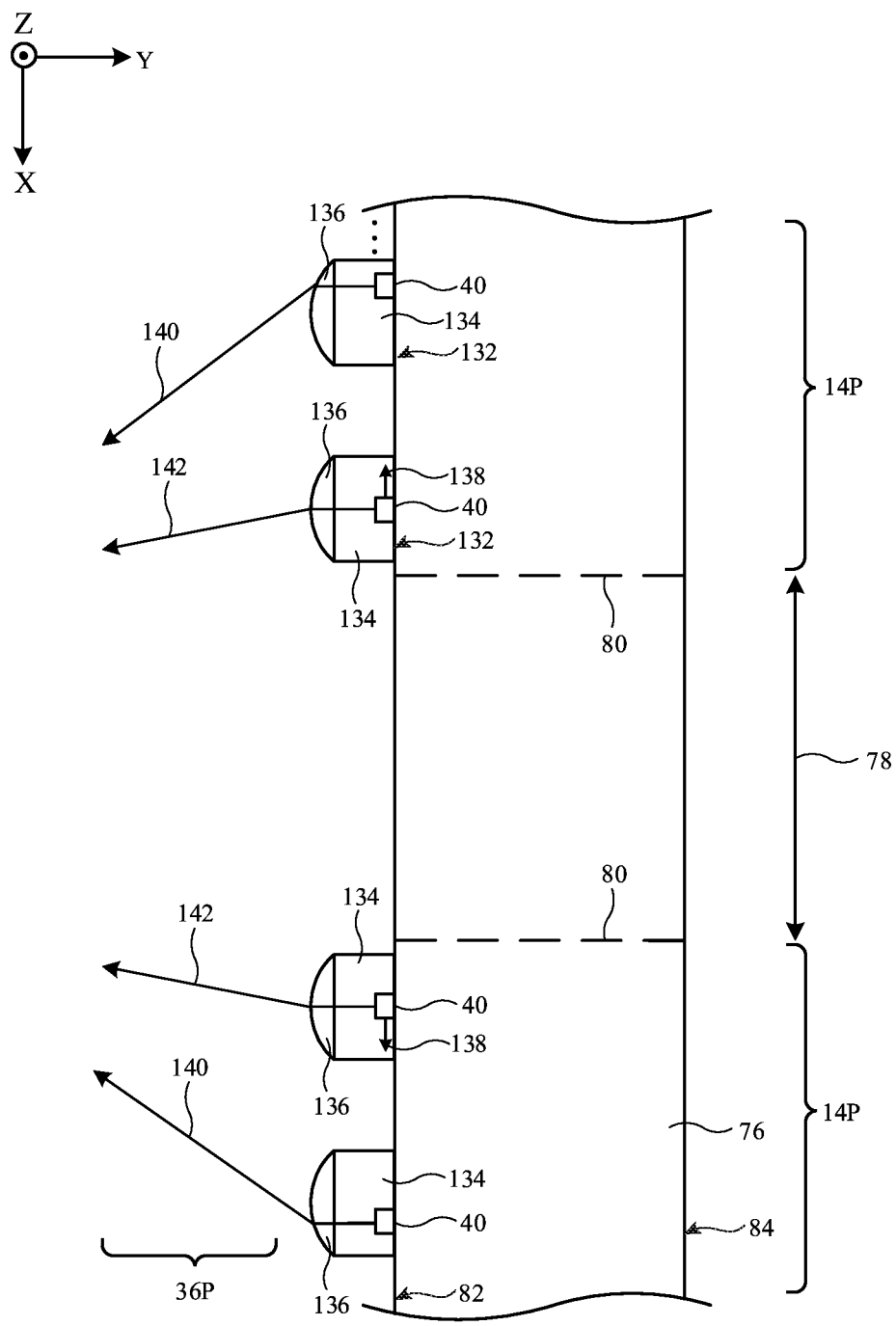
FIG. 19 is a cross-sectional top view showing how illustrative peripheral display light sources of the type shown in FIG. 18 may be provided with microstructures for directing peripheral display light towards an eye box in accordance with some embodiments.

FIG. 19 is a diagram showing how microstructures 132 may include microlenses in one suitable example. As shown in FIG. 19, microlenses 136 may be placed over each peripheral light source 40. Each peripheral light source 40 may be disposed within a respective encapsulant 134 (e.g., microstructures 132 of FIG. 18 may include microlenses 136 and encapsulant 134). Microlenses 136 may be mounted to encapsulant 134.

The position of peripheral light source 40 relative to the overlying microlens 136 may be adjusted, as shown by arrows 138, to change the direction of the peripheral light 36P emitted by peripheral light sources 40 (e.g., peripheral light sources 40 may be offset relative to the center of the overlying microlens 136 by different distances across the lateral area of substrate 76). By adjusting the relative position of microlenses 136 and peripheral light sources 40 across the lateral area of substrate 76, peripheral light 36P may be directed towards eye box 24 regardless of the location of peripheral light source 40 on substrate 76.

For example, peripheral light sources 40 that are relatively close to field of view 78 may be provided at a first position relative to the corresponding overlying microlens 136, such that the microlens directs peripheral light 36P from that peripheral light source 40 at a first angle (e.g., towards eye box 24), as shown by rays 142. At the same time, peripheral light sources 40 that are farther from field of view 78 may be provided at a second position relative to the corresponding overlying microlens 136, such that the microlens directs peripheral light 36P from that peripheral light source 40 at a second angle (e.g., towards eye box 24), as shown by rays 140. This type of arrangement may be used across the lateral area of substrate 76 to direct peripheral light 36P towards eye box 24 if desired.

Figure 20:
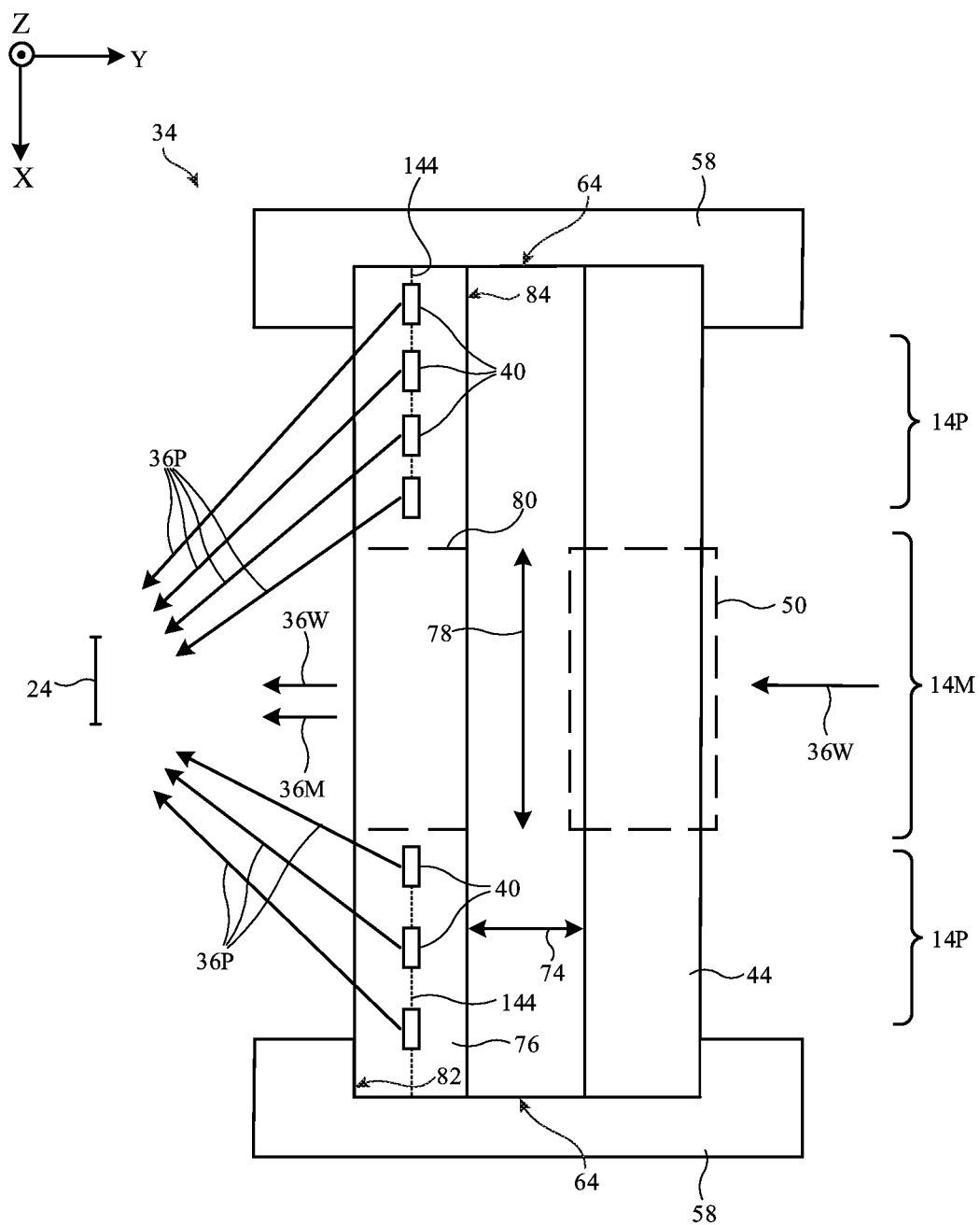
FIG. 20 is a cross-sectional top view of an illustrative optical system having a waveguide with an output coupler and a substrate with embedded peripheral display light sources that fill an area of the substrate between a frame and a periphery of the output coupler in accordance with some embodiments.

The example of FIGS. 18 and 19 in which peripheral light sources 40 are mounted to surface 82 of substrate 76 is merely illustrative. In another suitable arrangement, peripheral light sources 40 may be embedded within substrate 76, as shown in FIG. 20. As shown in FIG. 20, peripheral light sources 40 may be embedded within substrate 76 and may fill the lateral area of substrate 76 between field of view 78 and frame 58. Peripheral light sources 40 may emit peripheral light 36P towards eye box 24. If desired, microstructures may be formed on surface 82 and/or in substrate 76 to help direct peripheral light 36P towards eye box 24 regardless of the location of peripheral light source 40 on the lateral area of substrate 76.

Figure 21:
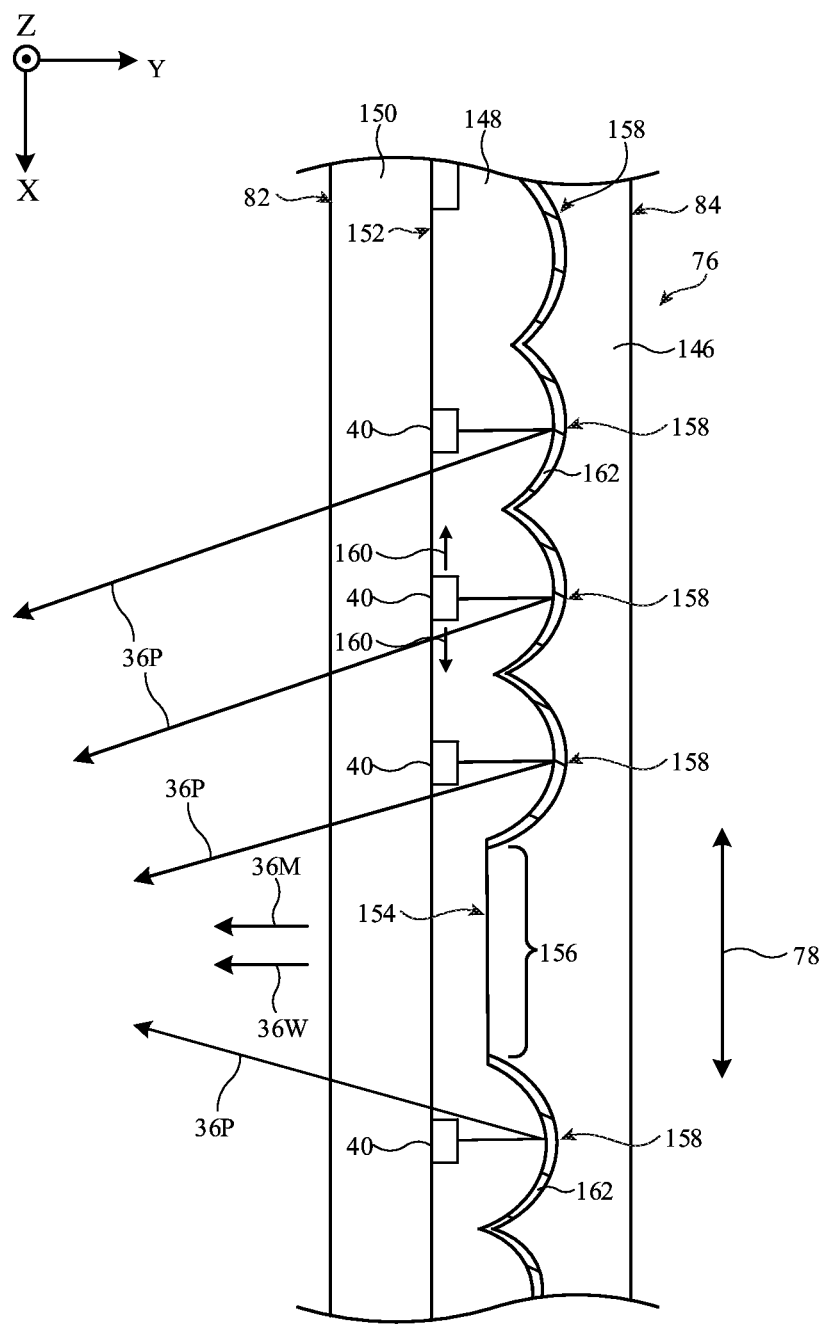
FIG. 21 is a cross-sectional top view showing how illustrative embedded peripheral display light sources of the type shown in FIG. 20 may be aligned with reflective optical cavities that direct peripheral display light towards an eye box in accordance with some embodiments.

The example of FIGS. 18-20 in which peripheral light sources 40 emit light towards eye box 24 is merely illustrative. In another suitable arrangement, peripheral light sources 40 may be embedded within substrate 76 (e.g., as shown in FIG. 20) but may emit light towards waveguide 44. FIG. 21 is a diagram showing how peripheral light sources 40 may be embedded within substrate 76 and may emit light towards waveguide 44.

As shown in FIG. 21, substrate 76 may include a first layer 146 and a second layer 150. First layer 146 may define surface 84 of substrate 76 whereas second layer 150 defines surface 82 of substrate 76. Layers 146 and 150 may both be optically transparent. First layer 146 may be separated from second layer 150 by gap 148. Gap 148 may be filled with air, optically clear adhesive, polymer, or other materials.

Peripheral light sources 40 may be mounted to surface 152 of second layer 150. Peripheral light sources 40 may emit peripheral light 36P towards first layer 146 (e.g., in the +Y direction). First layer 146 may have a surface 154 facing peripheral light sources 40. Surface 154 may be patterned to form cavities 158. Each cavity 158 may overlap a respective peripheral light source 40. The peripheral light 36P emitted by peripheral light sources 40 may reflect off of surface 154 (cavities 158) back towards eye box 24 (e.g., in the −Y direction).

The position of each peripheral light source 40 relative to the overlying cavity 158 may be adjusted, as shown by arrows 160, to change the direction of the peripheral light 36P reflected off of cavities 158. By adjusting the relative position of cavities 158 and peripheral light sources 40 across the lateral area of substrate 76, peripheral light 36P may be directed towards eye box 24 regardless of the location of peripheral light source 40 on substrate 76. If desired, the geometry of cavities 158 may vary by position across the lateral area of substrate 76 in addition to or instead of varying the relative position of peripheral light sources 40 to help direct peripheral light 36P towards eye box 24 regardless of the position of peripheral light sources 40 on substrate 76.

If desired, surface 154 of first substrate 76 may have a flat (planar) portion 156 overlapping field of view 78. World light 36W and main display light 36M may pass through planar portion 156. In another suitable arrangement, a hole or opening (e.g., opening 80 of FIG. 20) may be formed at the location of planar portion 156 of FIG. 21.

If desired, a coating such as coating 162 may be layered on surface 154 at cavities 158. Coating 162 may contribute to and/or tune the reflectivity of surface 154 for peripheral light 36P. If desired, coating 162 may be a wavelength-dependent reflective coating (e.g., a notch filter) that only reflects light of some wavelengths while transmitting light of all other wavelengths. As an example, coating 162 may be configured to only reflect light at the wavelengths of peripheral light 36P while passing all other wavelengths (e.g., wavelengths of main display light 36M and world light 36W). This may serve to minimize the visual impact of coating 162 on main display light 36M and world light 36W while tuning the reflectivity of surface 154 for peripheral light 36P, for example.

Figure 22:
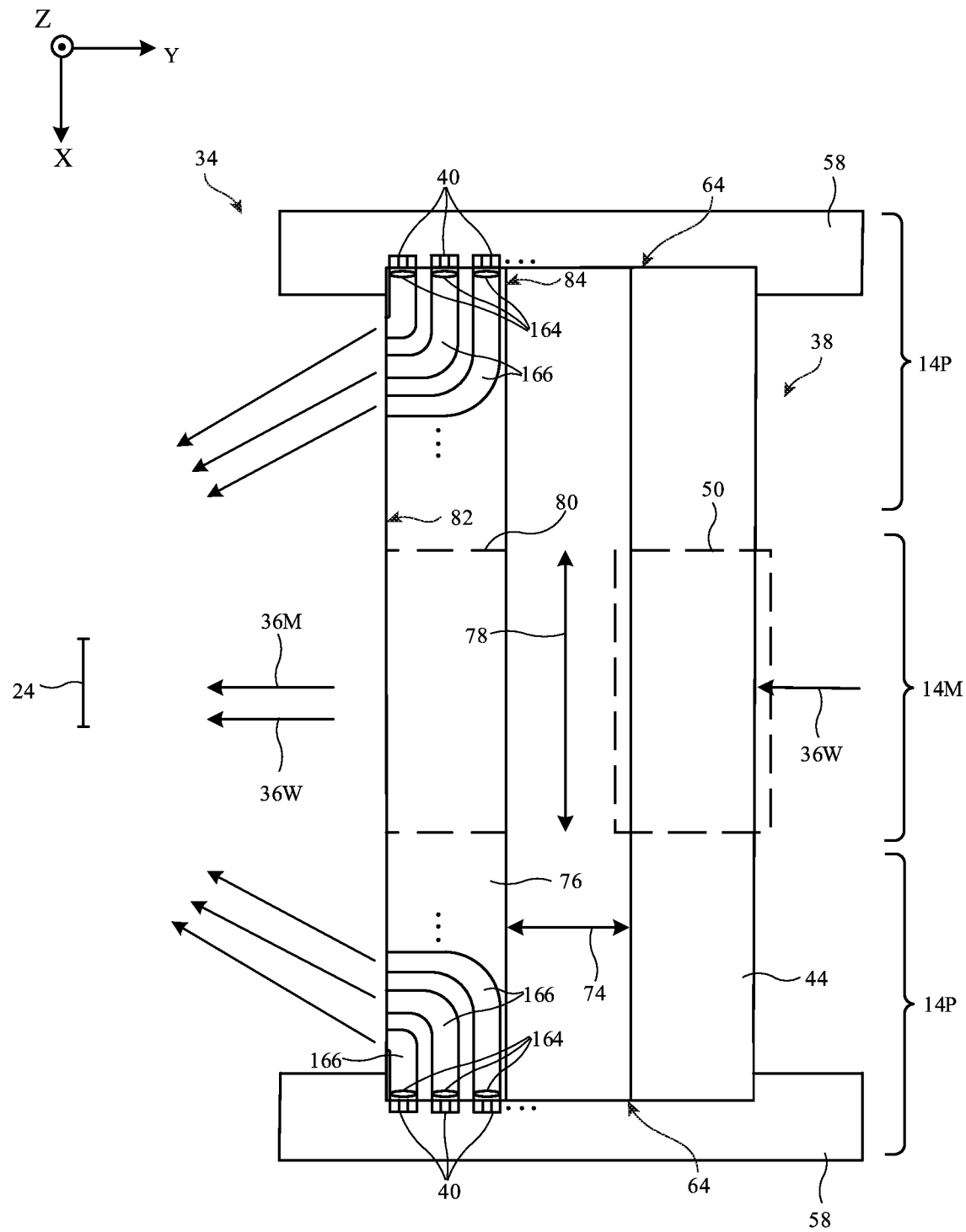
FIG. 22 is a cross-sectional top view of an illustrative optical system having a waveguide with an output coupler and a substrate with optical channels that route light from peripheral display light sources in a frame towards an eye box in accordance with some embodiments.

If desired, substrate 76 may include optical channels that help to direct peripheral light from peripheral light sources 40 to eye box 24. FIG. 22 is a cross-sectional side view showing how substrate 76 may include optical channels to help direct peripheral light sources 40 to eye box 24.

As shown in FIG. 22, peripheral light sources 40 may be embedded within frame 58 (e.g., at interior edge 64). Substrate 76 may include optical channels 166 having first (output) ends at surface 82 and second (input) ends at peripheral light sources 40 (interior edge 64). Optical channels 166 may form light guides for peripheral light 36P emitted by peripheral light sources 40. Optical channels 166 may, for example, be formed from a material having a first index of refraction (e.g., a core index of refraction) that is greater than the index of refraction of the surrounding material in substrate 76. This may allow peripheral light 36P emitted by peripheral light sources 40 to propagate down the length of optical channels 166 to surface 82 via total internal reflection. Peripheral light 36P may then scatter at surface 82 towards eye box 24 (e.g., within region 54 of FIG. 3).

Optical channels 166 may fill the lateral area of substrate 76 between field of view 78 and frame 58 (e.g., such that the optical fibers have output faces at the locations of peripheral light sources 40 of FIG. 18) or may fill any subset of this area if desired. If desired, optical coupling components 164 (e.g., lenses, prisms, etc.) may be used to help couple the peripheral light 36P emitted by peripheral light sources 40 into the input face of optical channels 166. Each channel 166 may convey peripheral light 36P of one or more colors (e.g., red, green, and blue light) emitted by a corresponding set of peripheral light sources 40 that emit the peripheral light into the input face of that optical channel. Optical channels 166 may be formed using optical fibers embedded within substrate 76 if desired.

Figure 23:
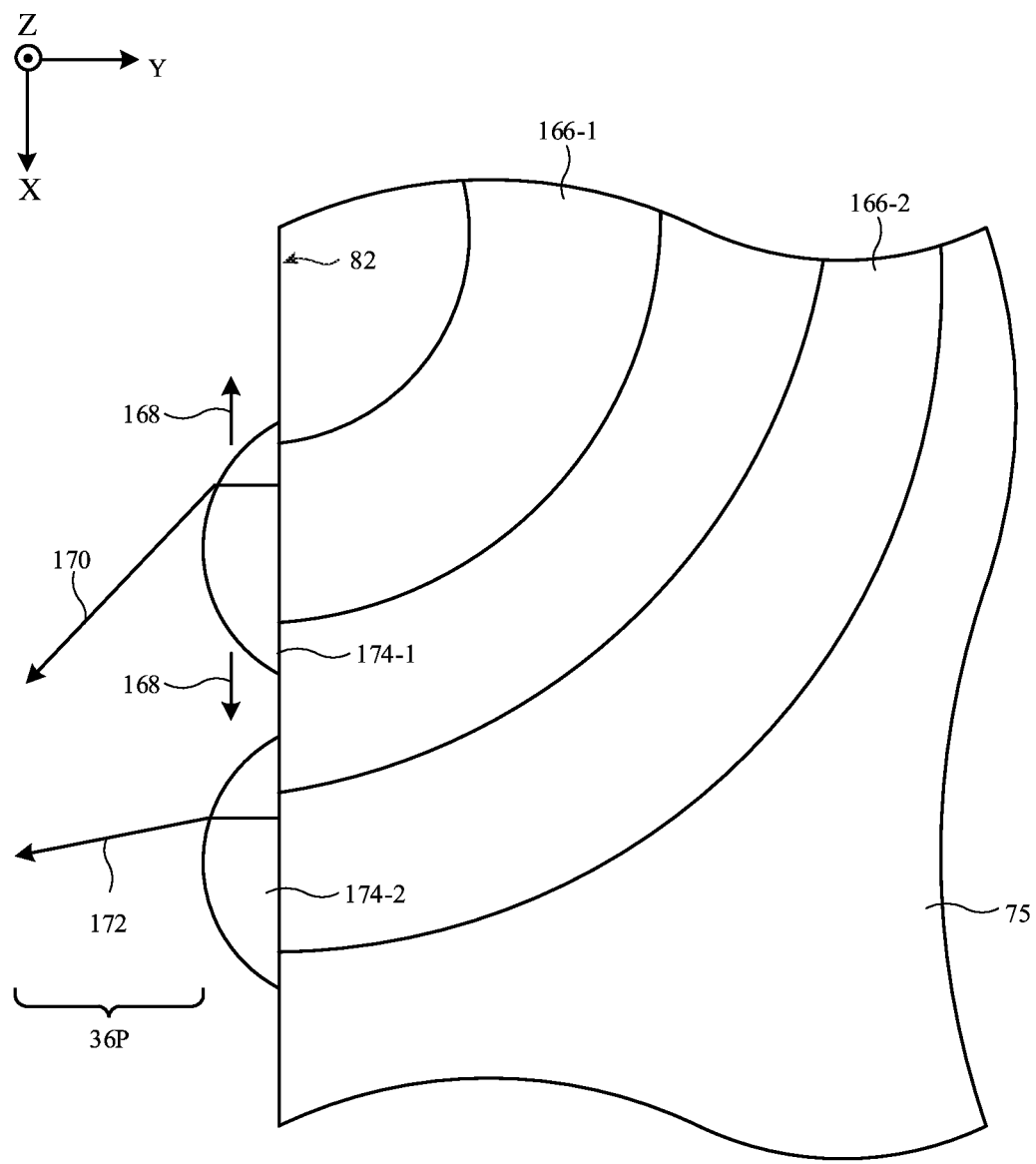
FIG. 23 is a cross-sectional top view showing how illustrative optical channels of the type shown in FIG. 22 may be provided with microstructures for directing peripheral display light towards an eye box in accordance with some embodiments.

If desired, microstructures such as microlenses may be provided at surface 82 to help direct peripheral light 36P from the output face of optical channels 166 towards eye box 24. FIG. 23 is a diagram showing how microstructures such as microlenses may be provided at surface 82 to help direct peripheral light 36P from the output face of optical channels 166 towards eye box 24.

As shown in FIG. 23, a first optical channel 166-1 may be provided with a first microlens 174-1 at surface 82 whereas a second optical channel 166-2 may be provided with a second microlens 174-2 at surface 82. The relative position of microlenses 174-1 and 174-2 may be adjusted, as shown by arrows 168, to control the angle with which peripheral light 36P is output from optical channels 166. For example, microlens 174-1 may be disposed on surface 82 at a first position relative to the output face of optical channel 166-1, which may configure the microlens to direct peripheral light 36P in a first direction, as shown by ray 170. At the same time, microlens 174-2 may be disposed on surface 82 at a second position relative to the output face of optical channel 166-2, which may configure the microlens to direct peripheral light 36P in a second direction, as shown by ray 172. By varying the relative positions of microlenses 174 across the lateral area of substrate 76, each optical channel 166 may produce peripheral light 36P at a corresponding angle to be provided to eye box 24 regardless of the location of the output face of the optical channel on substrate 76. If desired, the geometry of microlenses 174 may also be tuned to control the direction of peripheral light 36P. The examples of FIGS. 5-23 are merely illustrative. In general, any desired combination of the arrangements of FIGS. 5-23 may be used (e.g., peripheral light sources 40 may be located at any combination of the locations shown in FIGS. 5-23 for providing peripheral light 36P to eye box 24).

In accordance with an embodiment, a display system is provided that includes a frame, a display module configured to generate main image light, a waveguide having a lateral periphery mounted to the frame, the waveguide is configured to form an optical combiner that combines the main image light with real world light, an output coupler on the waveguide, the output coupler is configured to transmit the real world light and is configured to redirect the main image light towards an eye box within a field of view, and peripheral light sources mounted to the frame, the peripheral light sources are configured to produce peripheral image light that is scattered off of the waveguide towards the eye box about a periphery of the field of view.

In accordance with another embodiment, the output coupler includes volume holograms in the waveguide and configured to diffract the main image light towards the eye box within the field of view.

In accordance with another embodiment, the waveguide has a first surface facing the eye box and a second surface opposite the first surface, the peripheral light sources being configured to scatter the peripheral image light off of the first surface of the waveguide towards the eye box about the periphery of the field of view.

In accordance with another embodiment, the waveguide has a first surface facing the eye box and a second surface opposite the first surface, the peripheral light sources being configured to scatter the peripheral image light off of the second surface of the waveguide towards the eye box about the periphery of the field of view, the peripheral light sources include a first set of peripheral light sources configured to scatter the peripheral image light off of the second surface of the waveguide towards the eye box about the periphery of the field of view and the peripheral light sources include a second set of peripheral light sources configured to scatter the peripheral image light off of the first surface of the waveguide towards the eye box about the periphery of the field of view.

In accordance with another embodiment, the peripheral light sources include a light source selected from the group consisting of: a laser, a light-emitting diode, an organic light-emitting diode, and a micro light-emitting diode.

In accordance with another embodiment, the peripheral light sources include red, green, and blue light sources and the peripheral image light includes red, green, and blue light.

In accordance with an embodiment, a display system is provided that includes a frame, a display module configured to generate main image light, a waveguide having a lateral periphery mounted to the frame, the waveguide is configured to form an optical combiner that combines the main image light with real world light, an output coupler on the waveguide, the output coupler is configured to transmit the real world light and is configured to redirect the main image light towards an eye box within a field of view, a substrate having a lateral periphery mounted to the frame, reflective structures on the substrate and at least partially overlapping a periphery of the field of view, and a projector having light sources configured to produce peripheral image light, the projector is configured to project the peripheral image light towards the substrate, and the reflective structures are configured to reflect the peripheral image light towards the eye box.

In accordance with another embodiment, the reflective structures include a switchable liquid crystal layer having first and second states, the switchable liquid crystal layer is configured to absorb the peripheral image light in the first state, and the switchable liquid crystal layer is configured to reflect the peripheral image light towards the eye box in the second state.

In accordance with another embodiment, the substrate has a first surface facing the eye box and a second surface facing the waveguide, the reflective structures include angled portions of the first surface, and the angled portions are configured to reflect the peripheral image light towards the eye box.

In accordance with another embodiment, the angled portions of the first surface are oriented at different angles across a lateral area of the first surface.

In accordance with another embodiment, the display system includes a reflective coating layered on the angled portions of the first surface, the reflective coating is configured to reflect some wavelengths of the peripheral image light more than other wavelengths of the peripheral image light.

In accordance with another embodiment, the substrate has a first surface facing the eye box and a second surface facing the waveguide, the reflective structures include partially reflective angled mirrors embedded within the substrate between the first and second surfaces, and the partially reflective angled mirrors are configured to reflect the peripheral image light towards the eye box, the partially reflective angled mirrors are oriented at different angles across a lateral area of the substrate.

In accordance with another embodiment, the substrate has a first surface facing the eye box and a second surface facing the waveguide, the display system includes diffractive grating structures layered on the first surface of the substrate, the diffractive grating structures are configured to diffract the peripheral image light towards the eye box.

In accordance with another embodiment, the diffractive grating structures include a grating selected from the group consisting of a surface relief grating and a three-dimensional metal grating.

In accordance with another embodiment, the diffractive grating structures include holograms recorded in a grating medium layered on the first surface of the substrate.

In accordance with another embodiment, the holograms are configured to diffract the peripheral image light at different output angles across a lateral area of the grating medium.

In accordance with another embodiment, the holograms include a hologram selected from the group consisting of: a thin film hologram and a volume hologram.

In accordance with another embodiment, the display system includes a transparent substrate layered over the grating medium, the grating medium being interposed between the transparent substrate and the substrate.

In accordance with another embodiment, the substrate has an opening that overlaps the output coupler on the waveguide, and the reflective structures extend around a periphery of the opening.

In accordance with an embodiment, a display system is provided that includes a frame, a display module configured to generate main image light, a waveguide having a lateral periphery mounted to the frame, the waveguide is configured to form an optical combiner that combines the main image light with real world light, an output coupler on the waveguide, the output coupler is configured to transmit the real world light and is configured to redirect the main image light towards an eye box within a field of view, a substrate having a lateral periphery mounted to the frame, and peripheral light sources mounted to the frame, the peripheral light sources are configured to emit peripheral image light that is conveyed through the substrate to the eye box at a periphery of the field of view.

In accordance with another embodiment, the substrate includes a ring-shaped substrate having an opening that overlaps the output coupler, the peripheral light sources are molded within the ring-shaped substrate, including a diffuser on the ring-shaped substrate and configured to direct the peripheral image light towards the eye box at the periphery of the field of view, the diffuser includes a holographic diffuser.

In accordance with another embodiment, the substrate has a first surface facing the eye box and a second surface facing the waveguide, and the substrate includes optical channels that are aligned with the peripheral light sources and that are configured to convey the peripheral light from the peripheral light sources to the first surface.

In accordance with another embodiment, the display system includes optical elements configured to couple the peripheral image light from the peripheral light sources into input faces of the optical channels.

In accordance with another embodiment, the display system includes microlenses on the first surface of the substrate and overlapping output faces of the optical channels, the microlenses are configured to direct the peripheral image light from the output faces of the optical channels to the eye box at the periphery of the field of view, the microlenses have different alignments with respect to the output faces of the optical channels across a lateral area of the first surface of the substrate.

In accordance with another embodiment, the substrate has an opening aligned with the output coupler.

The foregoing is merely illustrative and various modifications can be made to the described embodiments. The foregoing embodiments may be implemented individually or in any combination.

What is claimed is:

1. A display system comprising:
a frame;
a display module configured to generate main image light;
a waveguide having a lateral periphery mounted to the frame, wherein the waveguide is configured to form an optical combiner that combines the main image light with real world light;
an output coupler on the waveguide, wherein the output coupler is configured to transmit the real world light in a first direction and is configured to redirect the main image light within a field of view;
a substrate having a lateral periphery mounted to the frame, wherein the substrate overlaps the waveguide in a second direction parallel to the first direction; and
peripheral light sources mounted to the substrate, wherein the peripheral light sources are configured to emit peripheral image light at a periphery of the field of view, wherein the peripheral light sources comprise a first set of light sources and a second set of light sources, wherein the first set of light sources faces a third direction, and wherein the second set of light sources faces a fourth direction opposite the third direction.

2. The display system of claim 1, wherein the substrate comprises a ring-shaped substrate having an opening that overlaps the output coupler.

3. The display system of claim 1, wherein the substrate has a first surface and a second surface opposite the first surface and facing the waveguide, and wherein the peripheral light sources are embedded within the substrate between the first and second surfaces.

4. The display system of claim 3, wherein the substrate has an opening aligned with the output coupler.

5. The display system of claim 2, wherein the peripheral light sources are molded within the ring-shaped substrate.

6. The display system of claim 5, further comprising a diffuser on the ring-shaped substrate and configured to direct the peripheral image light at the periphery of the field of view.

7. The display system of claim 6, wherein the diffuser comprises a holographic diffuser.

8. The display system of claim 6, wherein the diffuser comprises a tinted diffuser.

9. The display system of claim 1, wherein the main image light has a first resolution, the peripheral image light has a second resolution, and the second resolution is lower than the first resolution.

10. The display system of claim 1, wherein the peripheral light sources are configured to emit peripheral image light through the substrate.

11. The display system of claim 1, wherein the substrate comprises a material selected from the group consisting of: glass, plastic, and polymer.

12. The display system of claim 1, wherein the substrate comprises an optically transparent material.

13. The display system of claim 1, further comprising scattering structures on the substrate and configured to direct the peripheral image light at the periphery of the field of view.

14. The display system of claim 13, wherein the scattering structures overlap the peripheral light sources.

15. The display system of claim 1, wherein the substrate and the waveguide are separated by a gap.

16. The display system of claim 15, wherein the gap is filled with air or dielectric materials.

17. The display system of claim 1, wherein the substrate directly contacts the waveguide.

18. The display system of claim 1, wherein the peripheral image light comprises red, green, and blue peripheral light.

19. The display system of claim 1, wherein the peripheral light sources surround the lateral periphery of the waveguide.

20. The display system of claim 1, wherein the first set of light sources comprises at least a first light source that emits light at a first wavelength and a second light source that emits light at a second wavelength different from the first wavelength.

21. The display system of claim 1, wherein the lateral periphery of the waveguide is mounted to an interior edge of the frame, wherein the lateral periphery of the substrate is mounted to the interior edge of the frame, and wherein the first and second sets of light sources emit the peripheral image light away from the interior edge of the frame.

* * * * *